United States Patent
Siomina et al.

(10) Patent No.: US 10,708,831 B2
(45) Date of Patent: Jul. 7, 2020

(54) METHODS FOR NEIGHBOR CELL ADAPTIVE CONFIGURATION TO ENABLE ENHANCED COVERAGE OPERATION OF USER EQUIPMENT

(71) Applicant: Telefonaktiebolaget LM Ericsson (publ), Stockholm (SE)

(72) Inventors: Iana Siomina, Täby (SE); Muhammad Kazmi, Sundbyberg (SE); Santhan Thangarasa, Vällingby (SE); Kazuyoshi Uesaka, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 15/772,672

(22) PCT Filed: Nov. 8, 2016

(86) PCT No.: PCT/SE2016/051097
§ 371 (c)(1),
(2) Date: May 1, 2018

(87) PCT Pub. No.: WO2017/082801
PCT Pub. Date: May 18, 2017

(65) Prior Publication Data
US 2018/0317141 A1 Nov. 1, 2018

Related U.S. Application Data

(60) Provisional application No. 62/252,948, filed on Nov. 9, 2015.

(51) Int. Cl.
*H04W 36/00* (2009.01)
*H04L 1/18* (2006.01)
(Continued)

(52) U.S. Cl.
CPC ......... *H04W 36/0061* (2013.01); *H04L 1/189* (2013.01); *H04W 4/70* (2018.02);
(Continued)

(58) Field of Classification Search
CPC . H04W 36/0061; H04W 48/10; H04W 24/02; H04W 74/0833; H04W 4/70; H04W 36/0077; H04L 1/189
See application file for complete search history.

(56) References Cited

U.S. PATENT DOCUMENTS 9,585,164 B2 * 2/2017 Fong ............... H04W 74/002
2011/0310791 A1 * 12/2011 Prakash ............ H04W 24/02
370/315
(Continued)

FOREIGN PATENT DOCUMENTS

WO    2015 116870 A1    8/2015

OTHER PUBLICATIONS

3GPP TSG-RAN WG4 Meeting #76bis; Sophia Antipolis, France; Source: Ericsson; Title: RRM measurement requirements under normal coverage in RRC connected state (R4-156307)—Oct. 12-16, 2015.
(Continued)

*Primary Examiner* — Curtis A Alia
(74) *Attorney, Agent, or Firm* — Sage Patent Group

(57) ABSTRACT

A method in a wireless device (110A) is disclosed. The method comprises obtaining (804) information related to a signal transmission configuration for a target network node (115B), the information comprising a number of repetitions of a signal to be transmitted by the wireless device (110A) or to the wireless device (110A) by the target network node (115B) as part of performing at least one radio operation, wherein the number of repetitions is based on a coverage enhancement level of the wireless device (110A) with
(Continued)

respect to at least one of a neighbor cell (125B) associated with the target network node (115B) and a serving cell (125A) associated with a serving network node (115A) of the wireless device (110A). The method comprises performing (812) the at least one radio operation according to the obtained information related to the signal transmission configuration for the target network node (115B).

12 Claims, 15 Drawing Sheets

(51) Int. Cl.
  *H04W 4/70* (2018.01)
  *H04W 24/02* (2009.01)
  *H04W 48/10* (2009.01)
  *H04W 74/08* (2009.01)
(52) U.S. Cl.
  CPC ....... *H04W 24/02* (2013.01); *H04W 36/0077* (2013.01); *H04W 48/10* (2013.01); *H04W 74/0833* (2013.01)

(56) References Cited

U.S. PATENT DOCUMENTS

| | | | | |
|---|---|---|---|---|
| 2013/0308481 | A1* | 11/2013 | Kazmi | H04W 48/16 370/252 |
| 2015/0334659 | A1* | 11/2015 | Dimou | H04W 52/0206 370/311 |

OTHER PUBLICATIONS

PCT International Search Report for International application No. PCT/SE2016/051097—dated Feb. 22, 2017.

PCT Written Opinion of the International Searching Authority for International application No. PCT/SE2016/051097—dated Feb. 22, 2017.

PCT Notification of Transmittal of the International Preliminary Report on Patentability for International application No. PCT/SE2016/051097—dated Apr. 16, 2018.

\* cited by examiner

METHODS FOR NEIGHBOR CELL ADAPTIVE CONFIGURATION TO ENABLE ENHANCED COVERAGE OPERATION OF USER EQUIPMENT

PRIORITY

This nonprovisional application is a U.S. National Stage Filing under 35 U.S.C. § 371 of International Patent Application Serial No. PCT/SE2016/051097, filed Nov. 8, 2016, and entitled "Methods For Neighbor Cell Adaptive Configuration To Enable Enhanced Coverage Operation Of User Equipment" which claims priority to U.S. Provisional Patent Application No. 62/252,948 filed Nov. 9, 2015, both of which are hereby, incorporated by reference in their entirety,

TECHNICAL FIELD

The present disclosure relates, in general, to wireless communications and, more particularly, to methods for neighbor cell adaptive configuration to enable enhanced coverage operation of user equipment.

BACKGROUND

Machine-to-machine (M2M) communication (also referred to as machine-type communication (MTC)) is used to establish communication between devices and between devices and humans. The communication may include, for example, an exchange of data, signaling, measurement data, configuration information, and any other suitable types of communication. The device size may vary from that of a wallet to that of a base station. M2M devices are often used for applications such as sensing environmental conditions (e.g., a temperature reading), metering or measurement (e.g., electricity usage, etc.), fault finding or error detection, among other applications. In these applications, M2M devices are active very seldom but over a consecutive duration depending upon the type of service (e.g., about 200 ms once every 2 seconds, about 500 ms every 60 minutes, etc.). An M2M device may also perform measurements on other frequencies or other Radio Access Technologies (RATs).

An MTC device is expected to be of low cost and/or low complexity. In some cases, aa MTC or M2M device may be interchangeably referred to as a low-cost and/or low-complexity user equipment (UE) or a low-cost and/or low-complexity wireless device. The low-complexity UE envisaged for M2M operation may implement one or more low-cost features such as smaller downlink (DL) and uplink (UL) maximum transport block size (e.g., 1,000 bits) and/or reduced DL channel bandwidth of, for example, 1.4 MHz for the data channel (e.g., Physical Downlink Shared Channel (PDSCH)). Further possible features of a low-cost UE include a half-duplex Frequency Division Duplex (HD-FDD) and one or more of the following features: a single receiver (1 Rx) at the UE; smaller DL and/or UL maximum transport block size (e.g., 1,000 bits); and reduced UL and DL channel bandwidth of 1.4 MHz for the data channel. A low-cost UE may be considered a class of low-complexity UE. A low-complexity UE (e.g., a UE with 1 Rx) may be capable of supporting enhanced coverage mode of operation.

The path loss between an M2M device and the base station can be very large in some scenarios, such as when the M2M device is used as a sensor or metering device located in a remote location (such as in the basement of a building). In these scenarios, the path loss can be worse than 20 dB compared to normal operation, making reception of signals from the base station challenging. In order to address these issues, the coverage in UL and/or in DL has to be substantially enhanced with respect to normal coverage (also referred to as legacy coverage). In some cases, this is realized by employing one or a plurality of advanced techniques in the UE and/or in the radio network node for enhancing the coverage. Some non-limiting examples of these advanced techniques include, but are not limited to: transmit power boosting, repetition of transmitted signal, applying additional redundancy to the transmitted signal, and using an advanced and/or enhanced receiver. When employing such coverage enhancing techniques, the M2M devices are generally regarded as operating in "coverage enhancing mode." A low-complexity UE (e.g., a UE with 1 Rx) may also be capable of supporting enhanced coverage mode of operation.

Radio link monitoring (RLM) is performed to monitor the radio link quality of the connected serving cell and use that information to decide whether a UE is in-sync or out-of-sync with respect to that serving cell. RLM is carried out by a UE performing one or more measurements on DL reference symbols (e.g., Cell-Specific Reference Signals (CRS)) in RRC_CONNECTED state. If the results of RLM indicate a number of consecutive out-of-sync indications, then the network may declare radio link failure (RLF) until the monitoring indicates several consecutive in-sync indications. The actual procedure may be carried out by comparing the estimated DL reference symbol measurements to some target block error rate (BLER), $Q_{out}$ and $Q_{in}$. $Q_{out}$ and $Q_{in}$ correspond to the BLER of hypothetical Physical Downlink Control Channel (PDCCH)/Physical Control Format Indicator Channel (PCFICH) transmissions from the serving cell.

Radio measurements done by the UE are typically performed on the serving cell as well as on neighbour cells over some known reference symbols or pilot sequences. The measurements may be done on cells on an intra-frequency carrier, inter-frequency carrier(s), as well as on inter-RAT carriers(s) (depending upon the UE capability (i.e., whether it supports that RAT)). To enable inter-frequency and inter-RAT measurements for UE requiring gaps, the network has to configure the measurement gaps.

The measurements may be done for a variety of purposes. Some example measurement purposes include, but are not limited to: mobility; positioning; self-organizing network (SON); minimization of drive tests (MDT); operation and maintenance (O&M); network planning and optimization, and other purposes. Examples of measurements in LTE include, but are not limited to: Cell Identification (also referred to as Physical Cell ID (PCI) acquisition); Reference Symbol Received Power (RSRP); Reference Symbol Received Quality (RSRQ); acquisition of system information (SI); cell global ID (CGI) acquisition; Reference Signal Time Difference (RSTD); UE receive-transmit (RX-TX) time difference measurement; and RLM (which consists of Out-of-Synchronization (out-of-sync) detection and In-Synchronization (in-sync) detection). Channel State Information (CSI) measurements performed by the UE are used for scheduling, link adaptation, and other operations by the network. Examples of CSI measurements or CSI reports include Channel Quality Indicators (CQI), Precoding Matrix Indicator (PMI), Rank Indicator (RI), etc. They may be performed on reference signals like CRS, Channel State Information Reference Signals (CSI-RS), or Demodulation Reference Signals (DMRS).

The measurements may be unidirectional (e.g., DL or UL) or bidirectional (e.g., having UL and DL components such as Rx-Tx, Round Trip Time (RTT), etc.).

The DL subframe #0 and subframe #5 carry synchronization signals (i.e., both Primary Synchronization Signal (PSS) and Secondary Synchronization Signal (SSS)). In order to identify an unknown cell (e.g., a new neighbor cell), a UE has to acquire the timing of that cell and eventually the PCI. This is referred to as cell search, cell identification, or even cell detection. Subsequently, the UE also measures RSRP and/or RSRQ of the newly identified cell in order to use itself and/or report the measurement to the network node. In total, there are 504 PCIs. The cell search is also a type of measurement. The measurements are done in all Radio Resource Control (RRC) states (i.e., in RRC idle and connected states).

SUMMARY

To address the foregoing problems with existing approaches, disclosed is a method in a wireless device. The method comprises obtaining information related to a signal transmission configuration for a target network node, the information comprising a number of repetitions of a signal to be transmitted by the wireless device or to the wireless device by the target network node as part of performing at least one radio operation, wherein the number of repetitions is based on a coverage enhancement level of the wireless device with respect to at least one of a neighbor cell associated with the target network node and a serving cell associated with a serving network node of the wireless device. The method comprises performing the at least one radio operation according to the obtained information related to the signal transmission configuration for the target network node.

In certain embodiments, the information related to the signal transmission configuration for the target network node may comprise one of: a parameter that is the number of repetitions of the signal to be transmitted by the wireless device or to the wireless device by the target network node as part of performing the at least one radio operation; and an indication associated with a pre-defined parameter defining the number of repetitions of the signal to be transmitted by the wireless device or to the wireless device by the target network node as part of performing the at least one radio operation. The method may comprise transmitting the obtained information related to the signal transmission configuration for the target network node to the target network node.

In certain embodiments, the at least one radio operation may comprise a random access procedure associated with a cell change of the wireless device from the serving cell associated with the serving network node to the neighbor cell associated with the target network node. The obtained information related to the signal transmission configuration for the target network node may comprise a number of repetitions of a random access preamble to be transmitted by the wireless device to the target network node as part of the random access procedure. Performing the at least one radio operation according to the obtained information related to the signal transmission configuration for the target network node may comprise transmitting the random access preamble according to the number of repetitions of the random access preamble comprised in the obtained information related to the signal transmission configuration for the target network node.

In certain embodiments, the at least one radio operation may comprise identifying a cell global identity (CGI) of the neighbor cell associated with the target network node. The obtained information related to the signal transmission configuration for the target network node may comprise a number of repetitions of a broadcast transmission to the wireless device by the target network node. Performing the at least one radio operation according to the obtained information related to the signal transmission configuration for the target network node may comprise: receiving a number of broadcast transmissions from the target network node equal to the number of repetitions of the broadcast transmission comprised in the obtained information related to the signal transmission configuration for the target network node; and identifying the CGI of the neighbor cell based on the received broadcast transmissions.

In certain embodiments, obtaining information related to the signal transmission configuration for the target network node may comprise receiving, from the serving network node, information related to the signal transmission configuration for the target network node. Obtaining information related to the signal transmission configuration for the target network node may comprise determining, by the wireless device based on one or more pre-defined rules, the information related to the signal transmission configuration for the target network node. In certain embodiments, the method may comprise adapting the at least one radio operation based on the obtained information related to the signal transmission configuration for the target network node.

Also disclosed is a wireless device. The wireless device comprises one or more processors. The one or more processors are configured to obtain information related to a signal transmission configuration for a target network node, the information comprising a number of repetitions of a signal to be transmitted by the wireless device or to the wireless device by the target network node as part of performing at least one radio operation, wherein the number of repetitions is based on a coverage enhancement level of the wireless device with respect to at least one of a neighbor cell associated with the target network node and a serving cell associated with a serving network node of the wireless device. The one or more processors are configured to perform the at least one radio operation according to the obtained information related to the signal transmission configuration for the target network node.

Also disclosed is a method in a first network node. The method comprises determining a coverage enhancement level of at least one wireless device with respect to at least one of a serving cell associated with the first network node and a neighbor cell associated with a second network node. The method comprises determining, based at least in part on the determined coverage enhancement level of the at least one wireless device, a signal transmission configuration for the second network node. The method comprises configuring one or more of the second network node and the wireless device according to the determined signal transmission configuration.

In certain embodiments, the method may comprise sending the determined signal transmission configuration to one or more of the second network node and the wireless device. The determined signal transmission configuration for the second network node may comprise information related to a number of repetitions of a signal to be transmitted by one of the wireless device and the second network node as part of performing at least one radio operation, the number of repetitions based on the determined coverage enhancement level of the wireless device.

In certain embodiments, the at least one radio operation may comprise a random access procedure associated with a cell change of the wireless device from the serving cell associated with the first network node to the neighbor cell associated with the second network node. The signal transmission configuration may comprise information related to a number of repetitions of a random access preamble to be transmitted by the wireless device to the second network node as part of the random access procedure. Configuring one or more of the second network node and the wireless device according to the determined signal transmission configuration may comprise configuring the wireless device to transmit the random access preamble according to the number of repetitions of the random access preamble comprised in the signal transmission configuration for the second network node.

In certain embodiments, the at least one radio operation may comprise identifying a cell global identity (CGI) of the neighbor cell associated with the second network node. The signal transmission configuration may comprise a number of repetitions of a broadcast transmission to the wireless device by the second network node. Configuring one or more of the second network node and the wireless device according to the determined signal transmission configuration may comprise configuring the wireless device to: receive a number of broadcast transmissions from the second network node equal to the number of repetitions of the broadcast transmission comprised in the signal transmission configuration for the second network node; and identify the CGI of the neighbor cell based on the received broadcast transmissions.

In certain embodiments, the coverage enhancement level of the at least one wireless device with respect to at least one of the serving cell associated with the first network node and the neighbor cell associated with the second network node may be determined based on one or more of: one or more radio measurement results; a mobility profile of the wireless device; location information for the wireless device; and capability information for the wireless device.

In certain embodiments, the method may comprise determining one or more types of operations the wireless device may perform with respect to the second network node, wherein the signal transmission configuration for the second network node may be determined also based on the determined one or more types of operations the wireless device may perform with respect to the second network node.

Also disclosed is a first network node. The first network node comprises one or more processors. The one or more processors are configured to determine a coverage enhancement level of at least one wireless device with respect to at least one of a serving cell associated with the first network node and a neighbor cell associated with a second network node. The one or more processors are configured to determine, based at least in part on the determined coverage enhancement level of the at least one wireless device, a signal transmission configuration for the second network node. The one or more processors are configured to configure one or more of the second network node and the wireless device according to the determined signal transmission configuration.

Also disclosed is a method in a second network node. The method comprises obtaining information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node. The method comprises determining a signal transmission configuration for performing the at least one radio operation based on the obtained information related to the signal transmission configuration. The method comprises performing the at least one radio operation according to the determined signal transmission configuration.

In certain embodiments, the at least one radio operation may comprise a random access procedure associated with a cell change of the wireless device from the serving cell associated with the first network node to the neighbor cell associated with the second network node. The obtained information related to the signal transmission configuration for the second network node may comprise a number of repetitions of a random access preamble to be received by the second network node from the wireless device as part of the random access procedure. Performing the at least one radio operation according to the determined signal transmission configuration may comprise receiving the random access preamble according to the number of repetitions of the random access preamble comprised in the obtained information related to the signal transmission configuration for the second network node.

In certain embodiments, the at least one radio operation may comprise identifying a cell global identity (CGI) of the neighbor cell associated with the second network node. The obtained information related to the signal transmission configuration for the second network node may comprise a number of repetitions of a broadcast transmission to the wireless device by the second network node. Performing the at least one radio operation according to the obtained information related to the signal transmission configuration for the second network node may comprise transmitting a number of broadcast transmissions equal to the number of repetitions of the broadcast transmission comprised in the received information related to the signal transmission configuration for the second network node.

In certain embodiments, obtaining information related to the signal transmission configuration for the second network node may comprise receiving, from one or more of the first network node and the wireless device, information related to the signal transmission configuration for the second network node. The information related to the signal transmission configuration for the second network node may comprise at least one of: a parameter that is the number of repetitions of the signal to be transmitted by the second network node or to the second network node by the wireless device as part of performing the at least one radio operation; and an indication associated with a pre-defined parameter defining the number of repetitions of the signal to be transmitted by the second network node or to the second network node by the wireless device as part of performing the at least one radio operation. In certain embodiments, the method may comprise adapting the determined signal transmission configuration for performing the at least one radio operation.

Also disclosed is a second network node. The second network node comprises one or more processors. The one or more processors are configured to obtain information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node. The one or more processors are configured to determine a signal transmission configuration for performing the at least one radio operation based on the obtained information related to the signal transmission configuration. The one or more processors are configured to perform the at least one radio operation according to the determined signal transmission configuration.

Certain embodiments of the present disclosure may provide one or more technical advantages. For example, certain embodiments may advantageously enable operation of low-complexity UEs that perform one or more operations based on one or more transmissions in a neighbor cell. As another example, certain embodiments may enable a UE operating in extended or enhanced coverage to successfully receive signals from a neighbor cell. As still another example, certain embodiments may enable a neighbor cell to only transmit signals with repetition when the UE is in extended coverage zone with respect to the neighbor cell, which may advantageously prevent the neighbor cell having to repeatedly transmit the same signals continuously or unnecessarily. As yet another example, certain embodiments may advantageously allow the radio resources used for transmission of signals to be used more efficiently in a neighbor cell, since repetition of signals may be performed only when required. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
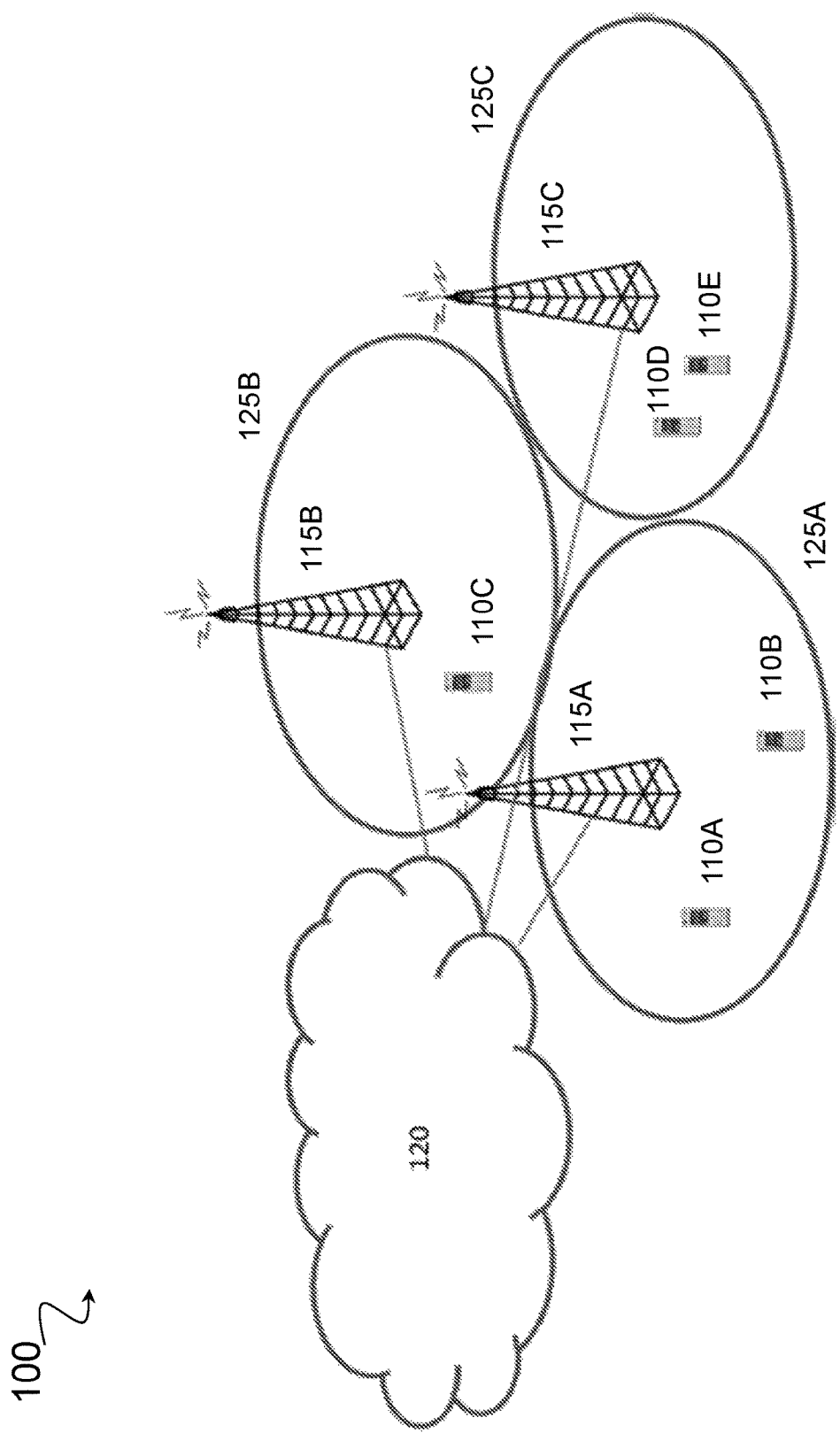
FIG. 1 is a block diagram illustrating an embodiment of a wireless communications network, in accordance with certain embodiments.

A UE may perform one or more operations on a neighbor cell (e.g., performing a measurement or reading SI). In some cases, these operations may require information related to configurations for transmission and/or reception of radio signals in the neighbor cell. If a particular signal configuration is not configured in the neighbor cell, performance of the UE may be degraded, or the UE may not meet one or more requirements. For example, a cell change of the UE (e.g., handover, cell reselection, RRC re-establishment, RRC connection release with redirection, etc.) to the neighbor cell may fail if the cell change procedure for that UE is executed by the serving cell. At the same time, statically configuring signal transmission and/or reception configurations in the neighbor cell may not be optimal, and may even conflict with another configuration that may be more desirable for another purpose.

The present disclosure contemplates various embodiments that may address these and other deficiencies. In certain embodiments, to facilitate the operation of UEs of a certain type (e.g., MTC or enhanced MTC UEs) in a target area associated with a first network node, the transmission configuration related to repetitions or redundancy is adapted in a second network node. The second network node may be a neighbor node to the first network node. In certain embodiments, the first network node may be interchangeably referred to as a serving network node, and the second network node may be interchangeable referred to as a target network node. As described herein, the transmission configuration or signal transmission configuration may be interchangeably referred to as repetition parameters or repetition parameter values. The adaptation methods are provided in general and also for specific channels/signals. Any two or more of the embodiments described herein may be combined in any way with each other.

According to one example embodiment, a method in a wireless device is disclosed. The wireless device obtains information related to a signal transmission configuration for a target network node, the information comprising a number of repetitions of a signal to be transmitted by the wireless device or to the wireless device by the target network node as part of performing at least one radio operation. The number of repetitions may be based on a coverage enhancement level of the wireless device with respect to at least one of a neighbor cell associated with the target network node and a serving cell associated with a serving network node of the wireless device. The wireless device performs the at least one radio operation according to the obtained information related to the signal transmission configuration for the target network node.

According to another example embodiment, a method in a first network node is disclosed. The first network node determines a coverage enhancement level of at least one wireless device with respect to at least one of a serving cell associated with the first network node and a neighbor cell associated with a second network node. The first network node determines, based at least in part on the determined coverage enhancement level of the at least one wireless device, a signal transmission configuration for the second network node. The first network node configures one or more of the second network node and the wireless device according to the determined signal transmission configuration.

According to another example embodiment, a method in a second network node is disclosed. The second network node obtains information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node. The second network node determines a signal transmission configuration for performing the at least one radio operation based on the obtained information related to the signal transmission configuration. The second network node performs the at least one radio operation according to the determined signal transmission configuration.

In certain embodiments, the adapted/configured transmissions may be transmitted by the second network node. In another example, the adapted/configured transmissions are then transmitted by the UE. In yet another example, the adapted/configured transmissions are then transmitted by the second network node and the UE (e.g., to enable bidirectional measurements).

As described in more detail below, the first network node (which may be interchangeably referred to as a serving network node) may be any suitable network node. For example, in some embodiments the first network node may be a radio network node or a core network node. Similarly, the second network node (which may be interchangeably referred to as a target network node) may be any suitable network node. For example, in some embodiments the second network node may be a radio network node or a core network node. The wireless device may be any suitable device (e.g., a wireless device or sensor). The target area may comprise one of a cell, a tracking area, a geographical area, a cell portion, an overlapping area of two cells, or any other suitable area.

Certain embodiments of the present disclosure may provide one or more technical advantages. For example, certain embodiments may advantageously enable operation of low-complexity UEs that perform one or more operations based on one or more transmissions in a neighbor cell. As another example, certain embodiments may enable a UE operating in extended or enhanced coverage to successfully receive signals from a neighbor cell. As still another example, certain embodiments may enable a neighbor cell to only transmit signals with repetition when the UE is in extended coverage zone with respect to the neighbor cell, which may advantageously prevent the neighbor cell having to repeatedly transmit the same signals continuously or unnecessarily. As yet another example, certain embodiments may advantageously allow the radio resources used for transmission of signals to be used more efficiently in a neighbor cell, since repetition of signals may be performed only when required (i.e., when the UE receiving the signals is in the extended coverage zone with respect to the neighbor cell). Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more wireless devices 110 (which may be interchangeably referred to herein as UEs 110 or MTC UEs 110), network node(s) 115 (which may be interchangeably referred to as eNodeBs (eNBs) 115). Wireless devices 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, wireless devices 110 may have D2D capability. Thus, wireless devices 110 may be able to receive signals from and/or transmit signals directly to another wireless device. For example, wireless device 110A may be able to receive signals from and/or transmit signals to wireless device 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110.

In some embodiments, the non-limiting term wireless device or UE is used. Wireless devices 110 described herein can be any type of wireless device capable of communicating with network nodes 115 or another wireless device 110 over radio signals. Wireless device 110 may also be a radio communication device, target device, device-to-device (D2D) UE, machine-type-communication UE or UE capable of machine to machine communication (M2M), a sensor equipped with UE, Tablet, mobile terminals, smart phone, laptop embedded equipped (LEE), laptop mounted equipment (LME), USB dongles, Customer Premises Equipment (CPE), etc. In certain embodiments, wireless devices 110 may be low-cost and/or low-complexity UEs. A low-cost and/or low-complexity UE can be any type of MTC device. A low-complexity UE may, for example, be a low-cost UE. The UE may be in RRC_IDLE or in RRC_CONNECTED state. Wireless devices 110 may operate under either normal coverage or enhanced coverage with respect to its serving cell. The enhanced coverage may be interchangeably referred to as extended coverage. Wireless devices 110 may also operate in a plurality of coverage levels (e.g., normal coverage, enhanced coverage level 1, enhanced coverage level 2, enhanced coverage level 3 and so on). In some cases, wireless devices 110 may also operate in out-of-coverage scenarios.

In certain embodiments, wireless devices 110 may be equipped with software, hardware, and/or functionalities (e.g., memory, processors, etc.) with reduced capability. Wireless devices 110 may have hardware and/or functionalities meeting a relaxed set of performance requirements (e.g., relaxed measurement time to measure cell). Wireless devices 110 may be configured to transmit and/or receive with a lower (nominal) energy spend. In some cases, wireless devices 110 may not be operable in a full range of operating modes required by a communication standard (which may justify the use of a specific cell configuration).

A wireless device 110 may be served by the serving cell or the Primary Cell (PCell), which in turn may be managed or served by a first network node 115. For example, wireless device 110A may be served by serving cell 125A served by first network node 115A (which may be interchangeably referred to as serving network node 115A). In some cases, a neighbor cell, such as cell 125B in the example of FIG. 1, can be a secondary serving or non-serving cell of the wireless device 110. The neighbor cell may be managed or served by a second network node, such as network node 115B, which may be interchangeably referred to as target network node 115B. In some embodiments, wireless devices 110 may be configured with PCell and Primary Secondary Cell (PSCell) or with PCell, PSCell and one or more Secondary Cells (SCells) (such as in dual connectivity). The configured cells are specific to a wireless device 110, and are also known as serving cells of the wireless device. There may be one or more wireless devices 110 in a cell. The various embodiments described herein are at least applicable to a wireless device in a high activity state (e.g., RRC CONNECTED state, active mode, etc.).

Also, in some embodiments generic terminology, "network node" is used. It can be any kind of network node, including a radio network node such as a base station (BS), radio base station, Node B, multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), or a core network node (e.g., MSC, TCE, MME, etc.), O&M, OSS, SON, positioning node (e.g., E-SMLC), MDT, or even an external node (e.g., $3^{rd}$ party node, a node external to the current network), or any other suitable network node. Note that any radio network node is a network node, but not any network node is a radio network node.

In certain embodiments, first network node 115A and second network node 115B may be comprised in the same or different physical nodes. In some cases, when first network node 115A and second network node 115B are comprised in the same physical node (e.g., the same base station or the same core network node), first network node 115A may be for example a logical entity associated with or controlling a first cell 125, and second network node 115B may be for example a logical entity associated with or controlling a second cell 125.

The term "radio node" used herein may be used to denote a UE or a radio network node.

The terminology such as network node and wireless device should be considered non-limiting and does in particular not imply a certain hierarchical relation between the two; in general "eNodeB" could be considered as device 1 and "wireless device" as device 2, and these two devices communicate with each other over some radio channel.

Example embodiments of wireless devices 110, network nodes 115, and other network nodes (such as radio network controller or core network node) are described in more detail below with respect to FIGS. 11-15.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards (including 5G standards) and using any suitable components, and are applicable to any RAT or multi-RAT systems in which the wireless device receives and/or transmits signals (e.g., data). For example, the various embodiments described herein may be applicable to Internet-of-Things (IoT), Narrowband IoT (NB-IoT), LTE, LTE-Advanced, UMTS, HSPA, GSM, cdma2000, WiMax, WiFi, another suitable RAT, or any suitable combination of one or more RATs. Although certain embodiments may be described in the context of wireless transmissions in the DL, the present disclosure contemplates that the various embodiments are equally applicable in the UL.

As described above, a low-complexity UE may operate under either normal coverage or enhanced coverage with respect to its serving cell. The enhanced coverage is also interchangeably called as extended coverage. The low-complexity UE may also operate in a plurality of coverage levels (e.g., normal coverage, enhanced coverage level 1, enhanced coverage level 2, enhanced coverage level 3 and so on).

Typically, the normal and extended coverage operations take place on narrower wireless device radio frequency (RF) bandwidth compared with the system bandwidth (also known as cell bandwidth, cell transmission bandwidth, etc.). In some embodiments, the wireless device RF bandwidth can be the same as the system bandwidth. Examples of narrow RF bandwidths include 200 KHz, 1.4 MHz, etc. Examples of system bandwidth include 200 KHz, 1.4 MHz, 3 MHz, 5 MHz, 10, MHz, 15 MHz, 20 MHz, etc. In the case of extended and/or enhanced coverage, wireless devices 110 may be capable of operating under lower signal quality level (e.g., Signal-to-Noise Ratio (SNR), Signal to Interference plus Noise Ratio (SINR), ratio of average received signal energy per subcarrier to total received power per subcarrier (Ês/Iot), RSRQ, etc.) compared to what is capable in legacy systems. The coverage level enhancement may vary with the operational scenario, and may also depend on the type of wireless device. For example, a wireless device that is located in a basement with bad coverage may need a larger level of coverage enhancement (e.g., 10 dB) compared to a wireless device that is at a cell border (e.g., 5 dB).

Wireless devices operating under low coverage enhancement may be different types of wireless devices than typical handheld wireless devices. Wireless devices capable of enhanced coverage could, for example, be mounted in a wall, a tower or other fixed position, and could therefore be less mobile than traditional handheld devices. To support coverage enhancement and narrower bandwidth operation (e.g., 200 KHz, 1.4 MHz, etc.) of such wireless devices, new control channels have been introduced. The new control channel, M-PDCCH, is in particular used by the wireless device for RLM operation.

The coverage level may be expressed in any suitable manner. For example, the coverage level may be expressed in terms of received signal quality and/or received signal strength at the wireless device with respect to its serving cell, received signal quality, and/or received signal strength at the serving cell with respect to the UE. Examples of signal quality include, but are not limited to, SNR, SINR, CQI, RSRQ, and Ês/Iot. Examples of signal strength include, but are not limited to, path loss and RSRP.

Any suitable number of coverage levels may be defined. To illustrate, consider the following examples. As one example, in certain embodiments two coverage levels may be defined with respect to signal quality (e.g., SNR) at the wireless device. In such a case, the coverage levels may be defined as follows:

Coverage enhancement level 1 (CE1) comprising $SNR \geq -6$ dB at the wireless device with respect to its serving cell; and Coverage enhancement level 2 (CE2) comprising $-12$ $dB \leq SNR < -6$ dB at the wireless device with respect to its serving cell.

As another example, in certain embodiments four coverage levels may be defined. In such a case, the coverage levels may be defined as follows:

Coverage enhancement level 1 (CE1) comprising $SNR \geq -6$ dB at the wireless device with respect to its serving cell;

Coverage enhancement level 2 (CE2) comprising $-12$ $dB \leq SNR < -6$ dB at the wireless device with respect to its serving cell;

Coverage enhancement level 3 (CE3) comprising $-15$ $dB \leq SNR < -12$ dB at the wireless device with respect to its serving cell; and Coverage enhancement level 4 (CE4) comprising $-18$ $dB \leq SNR < -15$ dB at the wireless device with respect to its serving cell.

In the above examples, CE1 may be interchangeably referred to as normal coverage level, baseline coverage level, reference coverage level, legacy coverage level, etc. On the other hand, CE2-CE4 may be interchangeably referred to as enhanced coverage or extended coverage level.

Under enhanced coverage operation, some channels support repetitions. In some cases, this also depends on the supported bandwidth. As an example, PBCH is repeated in subframe #0 and also in one more subframe. This other subframe for PBCH depends on whether it is a Frequency Division Duplex (FDD) or Time Division Duplex (TDD) system. In case it is FDD, the other subframe is #9. In case it is TDD, the other subframe is #5. In some cases, PBCH repetitions are not supported for narrow system bandwidth (e.g., 1.4 MHz).

Repetition is also supported for the M-PDCCH channel under enhanced coverage. In this case, repetitions across multiple subframes are supported as well as multiple repetition levels in time domain. Likewise, repetition is also supported for the PDSCH channel for wireless devices 110 operating under enhanced coverage. In such a case, repetitions and/or bundling of PDSCH transmissions across multiple subframes are supported. In the time domain, the repetitions and bundling can be configured to have different levels in the time domain. Depending on the operating scenario (e.g., the SNR levels) the network may adapt the repetition level.

Similar to the DL channels, repetitions are also supported in the UL. For wireless devices 110 operating under enhanced coverage, different repetitions and bundling can be configured. This level of repetitions and bundling can be adapted over the time (e.g., depending on changing radio conditions).

Figure 2:
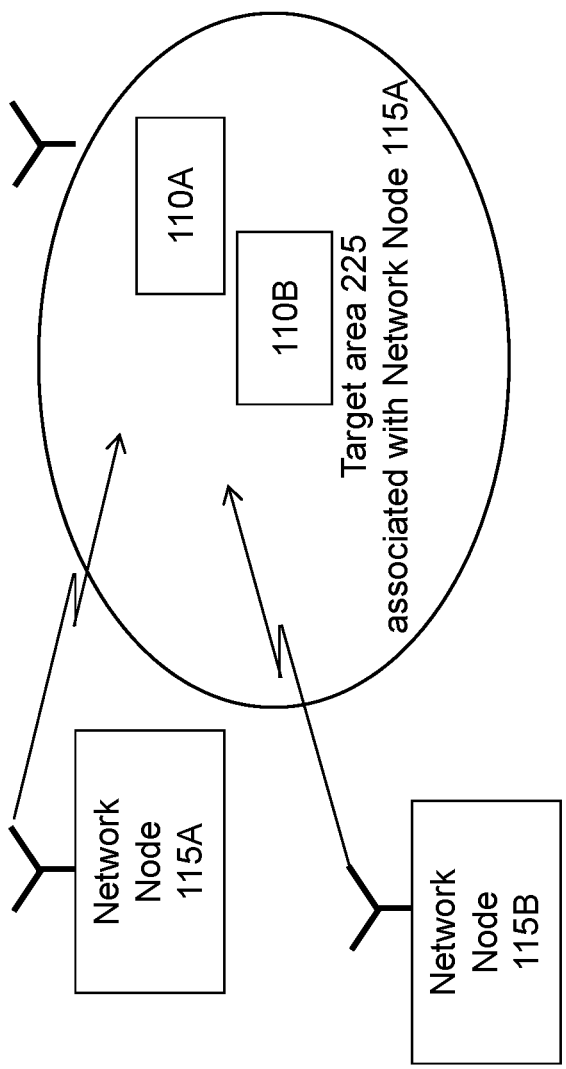
FIG. 2 illustrates an example scenario in a wireless communications network, in accordance with certain embodiments.

FIG. 2 illustrates an example scenario in a wireless communications network, in accordance with certain embodiments. More particularly, FIG. 2 illustrates a first network node 115A (which may be interchangeably referred to as serving network node 115A), a second network node 115B (which may be interchangeably referred to as target network node 115B), and wireless devices 110A and 110B. In certain embodiments, the example of FIG. 2 may include any suitable number of network nodes 115 and any suitable number of wireless devices 110. In certain embodiments, wireless devices 110A and 110B may be low-complexity UEs, such as those described above in relation to FIG. 1. In the example of FIG. 2, first network node 115A has a target area 225 associated with it. As used herein, the term target area associated with first network node 115A may be, for example, a cell, such as cell 125 described above with respect to FIG. 1, a tracking area, a cell portion, a geographical area, a location area, or an area with overlapping coverage of first network node 115A and second network node 115B.

First network node 115A and second network node 115B may be comprised in the same or different physical node. In certain embodiments, when first network node 115A and second network node 115B are comprised in the same physical node (e.g., the same base station), first network node 115A may be, for example, a logical entity associated with or controlling a first cell, and second network node 115B may be, for example, a logical entity associated with or controlling a second cell. First network node 115A and second network node 115B may operate on the same carrier frequency or on different carrier frequencies. In one exemplary embodiment, the carrier frequency operated by first network node 115A is a serving carrier frequency of wireless devices 110 whereas one or more carrier frequencies operated by second network node 115B may be the non-serving carriers of wireless devices 110. In yet another exemplary embodiment, the carrier frequency operated by first network node 115A is a primary serving carrier frequency (also known as Primary Component Carrier (PCC)) of the wireless device, whereas one or more carrier frequencies operated by one or more second network nodes 115B may be the secondary carrier frequencies (also known as Secondary Component Carriers (SCCs)) of the wireless device.

As described above, according to one example embodiment a method in a first network node, such as first network node 115A, is disclosed. In certain embodiments, first network node 115A serves a wireless device, such as wireless device 110A in FIG. 2. First network node 115A determines a coverage enhancement level of at least one wireless device 110, such as wireless device 110A, with respect to at least one of a serving cell associated with first network node 115A and a neighbor cell associated with a second network node 115, such as second network node 115B. First network node 115A determines, based at least in part on the determined coverage enhancement level of the at least one wireless device 110A, a signal transmission configuration for second network node 115B. In certain embodiments, the signal transmission configuration comprises information related to a number of repetitions of a signal to be transmitted by one of wireless device 110A and second network node 115B as part of performing at least one radio operation.

The number of repetitions may be the number of redundancy versions or the number of times the same signal of the same type is to be repeatedly transmitted by wireless device 110A or second network node 115B. The number of repetitions may be based on the determined coverage enhancement level of wireless device 110A. In certain embodiments, the signal transmission configuration may be pre-determined and associated with the determined coverage level.

First network node 115A configures one or more of second network node 115B and wireless device 110A according to the determined signal transmission configuration. In certain embodiments, configuring one or more of second network node 115B and wireless device 110A according to the determined signal transmission configuration may comprise triggering in second network node 115B the use of a pre-determined signal transmission configuration associated with the determined coverage level. In certain embodiments, the triggering may comprise sending a certain message or a signal of a certain type. In certain embodiments, first network node 115A sends the determined signal transmission configuration to one or more of the second network node 115B and wireless device 110A.

As one example, in certain embodiments, the at least one radio operation may comprise a random access procedure associated with a cell change of wireless device 110A from the serving cell associated with first network node 115A to a neighbor cell associated with second network node 115B. Examples of a cell change include, but are not limited to, handover, cell reselection, RRC re-establishment, RRC connection release with redirection, etc. The signal transmission configuration may comprise information related to a number of repetitions of a random access preamble to be transmitted by wireless device 110A to second network node 115B as part of the random access procedure. Configuring one or more of second network node 115B and wireless device 110A according to the determined signal transmission configuration may comprise configuring wireless device 110A to transmit the random access preamble according to the number of repetitions of the random access preamble comprised in the signal transmission configuration for second network node 115B.

As another example, the at least one radio operation may comprise identifying a cell global identity (CGI) of a neighbor cell associated with second network node 115B. The signal transmission configuration may comprise a number of repetitions of a broadcast transmission to wireless device 110A by second network node 115B. Configuring one or more of second network node 115B and wireless device 110A according to the determined signal transmission configuration may comprise configuring wireless device 110A to: receive a number of broadcast transmissions from second network node 115B equal to the number of repetitions of the broadcast transmission comprised in the signal transmission configuration for second network node 115B; and identify the CGI of the neighbor cell based on the received broadcast transmissions.

The present disclosure contemplates that the various embodiments described herein may be applied to any suitable signal transmission. Examples of the signal transmissions include, but are not limited to: physical signals (e.g., reference signals); physical channels (e.g., control channel, multicast or broadcast channels); and logical channels. Physical signal and physical channel are well known terms as described in 3GPP TS 36.211. A physical signal comprises a set of resource elements used by the physical layer, but does not carry information originating from higher layers. On the other hand, a physical channel comprises of a set of resource elements carrying information originating from higher layers (e.g., a transport channel, RRC message, etc.). Examples of DL physical signals include, but are not limited to, Cell-Specific Reference Signals (CRS), Reference Signals (RS), Primary Synchronization Signal (PSS), Secondary Synchronization Signal (SSS), Extended Synchronization Signals (ESS), Channel State Information Reference Signals (CSI-RS), Demodulation Reference Signals (DMRS), Positioning Reference Signals (PRS), Sounding Reference Signals (SRS), Multicast-Broadcast Single-Frequency Network Reference Signals (MBSFN RS), and any other suitable DL physical signal. Examples of DL physical channels include PDSCH, PBCH, Physical Multicast Channel (PMCH), PCFICH, PDCCH, Physical Hybrid ARQ Indicator Channel (PHICH), Enhanced Physical Downlink Control Channel (EPDCCH), M-PDCCH, M-PHICH, etc. System information such as system information broadcast (SIB1bis) may also be transmitted over physical channel such as PDSCH.

First network node 115A may determine the coverage level of the at least one wireless device 110A with respect to the serving cell served or managed by first network node 115A and/or with respect to a neighbor cell served or managed by second network node 115B in any suitable manner. In certain embodiments, first network node 115A may determine the coverage level of wireless device 110A based at least in part on one or more of the following data: one or more radio measurement results; a mobility profile of wireless device 110A; location information for wireless device 110A; and capability information for wireless device 110A.

For example, first network node 115A may obtain one or more radio measurements (such as one or more of RSRP, RSRQ, SINR and SNR) with respect to the serving cell and determine the coverage enhancement level for wireless device 110A in target area 225 associated with first network node 115A. As noted above, target area 225 associated with first network node 115A may be, for example, a cell, a tracking area, a cell portion, a geographical area, a location area, or an area with overlapping coverage of first network node 115A and second network nodes 115B. As another example, first network node 115A may obtain one or more radio measurements (such as RSRP and/or RSRQ and/or SINR and/or SNR) with respect to the neighbor cell and determine the coverage enhancement level for wireless device 110A in a target area associated with second network node 115B.

In certain embodiments, first network node 115A may also perform one or more radio measurements on signals transmitted by wireless device 110A to determine the coverage level (e.g., UL SINR, UL signal strength, etc.). First network node 115A may also combine the one or more radio measurements performed by wireless device 110A and the UL measurements performed by first network node 115A to more accurately determine the coverage level of wireless device 110A with respect to the serving cell and/or with respect to at least one neighbor cell.

In some cases, first network node 115A may also obtain a mobility profile for wireless device 110A to determine the coverage enhancement level of wireless device 110A in an area. The mobility profile for wireless device 110A may comprise one or more of: a speed or velocity (such as Doppler speed) of wireless device 110A, a direction of movement of wireless device 110B, an acceleration of wireless device 110A, a trajectory of wireless device 110A, and any other suitable information. In certain embodiments, first network node 115A may predict the coverage enhancement level of wireless device 110A at a future time based on information in the mobility profile for wireless device 110A (e.g., a direction of motion for wireless device 110A and a speed of wireless device 110A. First network node 115A may obtain the mobility profile for wireless device 110A in any suitable manner. As one example, first network node 115A may determine the mobility profile for wireless device 110A by measuring UL signals of wireless device 110A. As another example, first network node 115A may obtain the mobility profile for wireless device 110A by receiving it from another node (e.g., another network node 115 or wireless device 110).

In certain embodiments, first network node 115A may obtain location information for wireless device 110A, and use the obtained location information to determine a coverage enhancement level of wireless device 110A in target area 225. The location of wireless device 110A can be determined based on one or a combination of location methods (such as Global Navigation Satellite Signals (GNSS) or assisted-GNSS (A-GNSS), enhanced cell ID, time of arrival (TOA) of signals, Observed Time Difference of Arrival (OTDOA), etc.). The location of wireless device 110A may also be obtained by paging wireless device 110A (e.g., when it is in IDLE state). The location information may comprise any suitable information. For example, in certain embodiments the location information may comprise a geographical and/or logical location (e.g., location coordinates, proximity to an object with a known location, location in a cell or in a cell portion, location within a tracking area, etc.).

In certain embodiments, first network node 115A may obtain capability information for wireless device 110A. The capability information for wireless device 110A may be any suitable information. For example, in certain embodiments the capability information for wireless device 110A may indicate whether wireless device 110A is capable of operating (i.e., receiving and/or transmitting signals) under enhanced coverage (e.g., SINR<−6 dB). The capability information can be obtained in any suitable manner. For example, in certain embodiments first network node 115A may obtain the capability information for wireless device 110A from wireless device 110A and/or from another network node 115 that contains the capability information for wireless device 110A. As one example, if the capability information for wireless device 110A indicates that wireless device 110A is capable of operating under enhanced coverage, and wireless device 110A is also physically operating under enhanced coverage (e.g., SINR=−10 dB), then first network node 115A may consider that wireless device 110A is actually operating in enhanced coverage.

In some cases, first network node 115A may monitor (for example, either continuously or regularly) the coverage enhancement level of wireless device 110A in target area 225 by using one or more criteria described above. This enables first network node 115A to know any change in the coverage enhancement level of wireless device 110A in the area (e.g., with respect to one or more of first network node 115A, second network node 115B, and another network node 115).

In certain embodiments, first network node 115A may monitor the presence of wireless devices in target 225. The presence of wireless devices in target area 225 may comprise, for example, any one or more of: at least R (R=1, 2, ...) wireless devices are currently present in target area 225; and at least S (S=1, 2, ...) wireless devices are present in average in target area 225 over a certain time interval (e.g., pre-defined or configurable).

First network node 115A may determine the signal transmission configuration (which may be interchangeably referred to herein as repetition parameters or repetition parameter values) for second network node 115B in any suitable manner. In certain embodiments, first network node 115A may determine one or more parameters associated with the signal transmission configuration, which is to be used by the second network node 115B.

In certain embodiments, the signal transmission configuration for each type of signal (e.g., M-PDCCH) may comprise at least one of: a parameter (K) that is the number of repetitions of the signal to be transmitted by wireless device 110A or to wireless device 110A by second network node 115B as part of performing at least one radio operation; and an indication associated with a pre-defined parameter (K) defining the number of repetitions of the signal to be transmitted by wireless device 110A or to wireless device 110A by second network node 115A. To illustrate the concept of repetition described herein, consider the following example. Second network node 115B may transmit a first signal (e.g., an initial version of a signal or an original version of the signal (e.g., first data block or first transmission of a channel)) and also transmit at least a second signal that is the identical copy of the first signal. In certain embodiments, the number of repetition refers to the number of copies or subsequent copies of the first (i.e., initial) transmission of the signal (e.g., M-PDCCH). In certain embodiments, however, the number of repetition may include both initial as well as its subsequent copies. The various embodiments described herein are applicable to both meanings of the parameter K.

The repetition of the same signal can be performed in any suitable manner. For example, in certain embodiments the repetition of the same signal can be performed in time and/or frequency domain. This is shown as an example in Table 1 below. In certain embodiments, the suitable set of parameters determined by first network node 115A for each signal type depends on the determined coverage enhancement level of at least wireless device 110A. For example, if wireless device 110A is within coverage enhancement level CE3, and wireless device 110A is expected to receive signal type ST1, then first network node 115A will select the value of K=$\alpha_{13}$.

TABLE 1

General framework of signal transmission configuration (Example 1)

| Signal attributes | | Signal repetition level; number of times signal is repeated (K) | | | | |
|---|---|---|---|---|---|---|
| $ID_{ST}$ | Signal Type (ST) | $CE_1$ | $CE_2$ | $CE_3$ | ... | $CE_N$ |
| 0 | $ST_1$ | $\alpha_{11}$ | $\alpha_{12}$ | $\alpha_{13}$ | ... | $\alpha_{1N}$ |
| 1 | $ST_2$ | $\alpha_{21}$ | $\alpha_{22}$ | $\alpha_{23}$ | ... | $\alpha_{2N}$ |
| ... | ... | ... | ... | ... | ... | ... |
| M − 1 | $ST_M$ | $\alpha_{M1}$ | $\alpha_{M2}$ | $\alpha_{M3}$ | ... | $\alpha_{MN}$ |

In time domain, for example, the same signal can be transmitted $K_t$ times (e.g., K=10) in every time resource. In another example of repetition of the signal in time domain, the same signal can be transmitted $K_t$=10 times in every $I^{th}$ occurrence of the time resource (e.g., I=4). Examples of time resources include, but are not limited to: symbols, time slot, transmission time interval (TTI), interleaving time, frame, and any other suitable time resource.

In frequency domain, for example, the same signal can be transmitted $K_f$ times (e.g., $K_f$=5) in every frequency resource. In another example of repetition of the signal in frequency domain, the same signal can be transmitted $K_f$=5 times in every $J^{th}$ occurrence of the frequency resource (e.g., J=2). Examples of frequency resources include, but are not limited to: sub-carrier, resource blocks, carriers, and any other suitable time resource.

As another example of the repetition of the same signal transmission in both time and frequency, the same signal can be transmitted $K_t$ times in every $I^{th}$ time resource and $J_{th}$ frequency resource.

In the above examples, the parameters I and J may be defined in any suitable manner. For example, in certain embodiments the parameters I and J may be pre-defined or determined by first network node 115A and/or by second network node 115B.

In certain embodiments, first network node 115A may determine one or more types of operations wireless device 110A may perform with respect to second network node 115B (e.g., one or more measurements on signals transmitted by second network node 115B on the same type of signal). In such a scenario, the signal transmission configuration for second network node 115B may be determined also based on the determined one or more types of operations wireless device 110A may perform with respect to second network node 115B. Thus, in such a scenario the parameter K depends on signal type, operation type and coverage enhancement level. In order to select these parameters, first network node 115A may utilize a mapping data, such as the one shown as an example in Table 2 below.

TABLE 2

General framework of signal transmission configuration (Example 2)

| Signal attributes | | | | Signal repetition level; number of times signal is repeated (K) | | | | |
|---|---|---|---|---|---|---|---|---|
| $ID_{ST}$ | Signal Type (ST) | $ID_{OT}$ | Type | $CE_1$ | $CE_2$ | $CE_3$ | ... | $CE_N$ |
| 0 | $ST_1$ | 0 | $OT_{11}$ | $\alpha_{11}$ | $\alpha_{12}$ | $\alpha_{13}$ | ... | $\alpha_{1N}$ |
| | | ... | ... | ... | ... | ... | | ... |
| | | P | $OT_{1P}$ | $\alpha_{P1}$ | $\alpha_{P2}$ | $\alpha_{P3}$ | | $\alpha_{PN}$ |
| 1 | $ST_2$ | 0 | $OT_{21}$ | $\beta_{21}$ | $\beta_{22}$ | $\beta_{23}$ | ... | $\beta_{2N}$ |
| | | ... | ... | ... | ... | ... | | ... |
| | | P | $OT_{2P}$ | $\beta_{P1}$ | $\beta_{P2}$ | $\beta_{P3}$ | | $\beta_{PN}$ |
| ... | ... | ... | ... | ... | ... | ... | | ... |
| M − 1 | $ST_M$ | 0 | $OT_{M-1,1}$ | $\gamma_{M1}$ | $\gamma_{M2}$ | $\gamma_{M3}$ | ... | $\gamma_{MN}$ |
| | | ... | ... | ... | ... | ... | | ... |
| | | P | $OT_{M-1,P}$ | $\gamma_{P1}$ | $\gamma_{P2}$ | $\gamma_{P3}$ | | $\gamma_{PN}$ |

Note that Tables 1 and 2 described above express the data in a generalized form. The method of selecting one or more parameters related to the signal transmission configuration for use by second network node 115B is described in more detail below using specific examples as shown in Tables 3 and 4 below.

In the example in Table 3 below, the values of parameter K are defined for specific signals (i.e., physical channels and physical signals) for different enhanced coverage levels of wireless device 110A with respect to second network node 115B. For example, if wireless device 110B is expected to perform RSRP and CSI-RSRP measurements on the neighbor cell served by second network node 115B, then first network node 115A may select the values of K for CRS and CSI-RS corresponding to the coverage enhancement value of wireless device 110A with respect to second network node 115B based on Table 3 below. Typically, first network node 115A configures wireless device 110A to perform one or more measurements on one or more neighbor cells. Therefore, first network node 115A can be aware of whether or not wireless device 110A is expected to measure on the neighbor cell.

As another example, if wireless device 110A is configured to receive system information (e.g., CGI acquisition) of the neighbor cell, then wireless device 110A will have to receive Master Information Block (MIB) on the PBCH and one or more system information blocks (SIBs) transmitted on the PDSCH. In this case, first network node 115A may determine the values of K for PBCH and PDSCH corresponding to the CE value of wireless device 110A with respect to second network node 115B based on Table 3.

TABLE 3

Specific signal transmission configuration#1 (Example 3)

Signal repetition level; number of times signal is repeated (K)

| | Signal attributes | CE$_1$ | CE$_2$ (−12 dB ≤ SNR < −6 dB) | CE$_3$ (−15 dB ≤ SNR < −12 dB) | CE$_4$ (−18 dB ≤ SNR < −15 dB) |
|---|---|---|---|---|---|
| ID$_{ST}$ | ST | (SNR ≥ −6 dB) | | | |
| 0 | M-PDCCH | 0 | 10 | 40 | 100 |
| 1 | PDSCH | 0 | 1 | 3 | 5 |
| 2 | PBCH | 0 | 0 | 1 | 2 |

In the example in Table 4 below, the values of parameter K are defined separately for a particular type of operation using the same type of specific signals under different enhanced coverage levels of wireless device 110A with respect to second network node 115B. For example, if wireless device 110A is configured to receive SI from the neighbor cell, then the first network node may select the value of K for PDSCH corresponding to SI acquisition (i.e., ID$_{OT}$=0) and also the corresponding value of K for PBCH under the determined value of the enhanced coverage level of wireless device 110A with respect to second network node 115B.

TABLE 4

Specific signal transmission configuration#2 including operation type (Example 4)

Number of times signal is repeated (K)

| | | | | | CE$_2$ | CE$_3$ |
|---|---|---|---|---|---|---|
| | Signal attributes | | | | (−12 dB ≤ | (−15 dB ≤ |
| | | | Operation | CE$_1$ | | |
| ID$_{ST}$ | ST | ID$_{OT}$ | Type | (SNR ≥ −6 dB) | SNR < −6 dB) | SNR < −12 dB) |
| 0 | M-PDCCH | 0 | RLM | 0 | 0 | 10 |
| | | 1 | Acquiring scheduling information | 0 | 10 | 40 |
| 1 | PDSCH | 0 | SI acquisition | 0 | 1 | 3 |
| | | 1 | Data reception | 0 | 1 | 2 |
| 3 | PBCH | 0 | SI acquisition | 0 | 0 | 1 |
| | | 1 | Timing acquisition | 0 | 0 | 1 |

In certain embodiments, first network node 115A may send (e.g., transmit) information about the determined signal transmission configuration to one or more of second network node 115B and wireless device 110A. The signal transmission configuration information may contain information about one or a plurality of signal types. The examples of signal configurations expressed in Tables 1-4 above can be partly or fully pre-defined, or can be fully determined by the first network node.

In one example, when the tables are fully pre-defined first network node 115A may transmit only a set of identifiers of the determined one or more sets of the signal transmission configurations but without the value of K. In this case, second network node 115B may determine the value of K based on the pre-defined value of K. In another example, the signal transmission configuration may be pre-defined or pre-configured in second network node 115B, but may need to be triggered and/or invoked from first network node 115B (e.g., first network node 115B may inform or indicate to second network node 115B about the presence of one or more wireless devices 110 of a specific type (optionally with some additional information included)). In response to the received information and/or indication, second network node 115B may configure the corresponding transmission configuration.

In certain embodiments, the information sent to second network node 115B and/or wireless device 110A may vary depending on the implementation. For example, if the determined signal transmission configuration is based on Table 1 above (or specific Table 3 above), then first network node 115A may transmit any of the following set of information to second network node 115B: {ID$_{ST}$, CE$_N$}; {ID$_{ST}$, K}; and {ID$_{ST}$, CE$_N$, K}. As another example, if the determined signal transmission configuration is based on Table 1 above (or specific Table 4 above), then first network node 115A may transmit any of the following set of information to the second network node: {ID$_{ST}$, ID$_{OT}$, CE$_N$}; {ID$_{ST}$, D$_{OT}$, K}; and {ID$_{ST}$, ID$_{OT}$, CE$_N$, K}.

Any of the above sets of information transmitted to second network node 115B may be applicable over a pre-defined time period or can be applicable over a configurable time period. For example, in the latter case first network node 115A may also associate any of the above signal configuration information with the time period over which it applies. The applicable time period may depend on, for example, the duration over which a particular operation is expected to last. For example, this could be equal to or larger than the measurement period of a radio measurements (e.g., CGI acquisition time). Examples of a pre-defined applicable time period include, but are not limited to: 5 seconds, over measurement period, or infinite time, etc.

In certain embodiments, first network node 115A may also deactivate any one or more signal transmission configurations previously transmitted to second network node 115B. For example, if wireless device 110A stops using any of the signal type for all operations or any operation then first network node 115A may request second network node 115B to stop transmitting the corresponding signals using the previously indicated signal transmission configuration(s). In some cases, first network node 115A may also modify or update the signal transmission configuration(s) at second network node 115B in case the coverage enhancement level of wireless device 110A changes and/or in case the ongoing or previous operation(s) is no longer performed by wireless device 110A.

First network node 115A may transmit the information in any suitable manner, for example using one or more types of signaling. In certain embodiments, first network node 115A may transmit the information periodically, upon a triggering event or when certain condition is met, upon a request from another node, in an unsolicited manner, or in any other suitable manner.

In certain embodiments, first network node 115A may also transmit any one or more sets of information related to the determined signal transmission configuration to wireless device 110A. In some cases, the information transmitted to wireless device 110A may be the same as transmitted to second network node 115A described above. Wireless device 110A may use the received information in any suitable manner. For example, wireless device 110A may use the received information for one or more tasks or operations. Examples of the tasks or operations for which wireless device 110A may use the received information are described in more detail below. In another example embodiment, the transmission configuration of second network node 115B may be pre-defined and known to wireless device 110A, but using this configuration information for one or more tasks or operations may need to be triggered and/or invoked from first network node 115A.

As described above, according to another example embodiment a method in second network node 115B is disclosed. In some cases, network node 115B may be serving or managing a secondary serving cell or a non-serving cell for wireless device 110A. Second network node 115B obtains information related to a signal transmission configuration for second network node 115B. The information may comprise a number of repetitions of a signal to be transmitted by second network node 115B or to second network node 115B by a wireless device 110, such as wireless device 110A, as part of performing at least one radio operation. The number of repetitions may be based on a coverage enhancement level of wireless device 110A with respect to at least one of a neighbor cell associated with second network node 115B and a serving cell associated with first network node 115A. Second network node 115B determines a signal transmission configuration for performing the at least one radio operation based on the obtained information related to the signal transmission configuration. Second network node 115B performs the at least one radio operation according to the determined signal transmission configuration.

For example, in certain embodiments the at least one radio operation may comprise a random access procedure associated with a cell change of wireless device 110A from the serving cell associated with first network node 115A to the neighbor cell associated with second network node 115B. The obtained information related to the signal transmission configuration for second network node 115B may comprise a number of repetitions of a random access preamble to be received by second network node 115B from wireless device 110A as part of the random access procedure. Performing the at least one radio operation according to the determined signal transmission configuration may comprise receiving the random access preamble according to the number of repetitions of the random access preamble comprised in the obtained information related to the signal transmission configuration for second network node 115B.

As another example, in certain embodiments the at least one radio operation may comprise identifying a cell global identity (CGI) of the neighbor cell associated with second network node 115B. The obtained information related to the signal transmission configuration for second network node 115B may comprise a number of repetitions of a broadcast transmission to wireless device 110A by second network node 115B. Performing the at least one radio operation according to the obtained information related to the signal transmission configuration for second network node 115B may comprise: transmitting a number of broadcast transmissions equal to the number of repetitions of the broadcast transmission comprised in the received information related to the signal transmission configuration for second network node 115B.

Second network node 115B may obtain the information related to the signal transmission configuration for second network node 115B in any suitable manner. For example, in certain embodiments second network node 115B may receive, from one or more of first network node 115A and wireless device 110A, information related to the signal transmission configuration for second network node 115B.

The signal information may comprise any suitable information. For example, in certain embodiments the signal information may comprise one or more sets of information related to the signal transmission configurations for one or more signals. The set of information may comprise at least one of: a parameter (K) that is the number of repetitions of the signal to be transmitted by second network node 115B or to second network node 115B by wireless device 110A as part of performing the at least one radio operation; and an indication associated with a pre-defined parameter defining the number of repetitions of the signal to be transmitted by second network node 115B or to second network node 115B by wireless device 110A as part of performing the at least one radio operation. The number of repetitions may be the number of redundancy versions or the number of times the same signal is to be transmitted or repeated by second network node 115B.

Second network node 115B determines a signal transmission configuration of one or more signals for performing the at least one radio operation based on the obtained information related to the signal transmission configuration (e.g., based on at least the set of information received from first network node 115A and/or from wireless device 110A).

Second network node 115B may perform any suitable radio operations according to the determined signal transmission configuration. For example, second network node 115B may transmit and/or receive one or more signals according the determined transmission configuration.

In certain embodiments, second network node 115B may adapt the determined signal transmission configuration for performing the at least one radio operation. As described above, second network node 115B may receive from first network node 115A and/or wireless device 110A one or more sets of information related to the signal transmission configurations of the signals that are being transmitted or expected to be transmitted by second network node 115B. The received information may be the same as that described above with respect to the determination of one or more parameters associated with the signal transmission configuration. Second network node 115B may use the obtained information to adapt the transmission of one or more signals based on at least the received information. In one non-limiting example, second network node 115B may transmit the signal according to the configuration provided to it by first network node 115B and/or wireless device 110A. In another example, second network node 115B may adapt the received signal transmission configuration and may transmit signals according to the adapted signal transmission configuration. The adaptation of the signal transmission configuration may be performed for one or a subset of signals or for all signals. In certain embodiments, the adapted/configured transmissions are then transmitted by second network node 115B. In yet another example, the adapted/configured transmissions are then transmitted by the second network node and the UE (e.g., to enable bidirectional measurements).

For example, assume that second network node 115B receives a signal transmission configuration requiring it to repeat a certain channel (e.g., PDSCH) K=40 times. In one example, second network node 115B transmits K=40 times the same signal (i.e., copy) of PDSCH. In another example, second network node 115B adapts the value of K to K=50 and transmits K=50 times the same signal (i.e., copy) of MPDSCH.

In one exemplary implementation, second network node 115B may transmit the signal according to the signal transmission configuration for one set of signal repetition levels (e.g., over duration for transmitting signal with K=50 times). In another example, second network node 115B may transmit the signal according to the signal transmission configuration over a certain pre-defined duration or over a duration indicated by one or more of first network node 115A and wireless device 110A.

According to another example embodiment, a method in a wireless device, such as wireless device 110A is disclosed. In certain embodiments, wireless device 110A may be served by first network node 115A, which may be interchangeably referred to herein as serving network node 115A. Wireless device 110A obtains information related to a signal transmission configuration for a second network node 115B (which may be interchangeably referred to herein as target network node 115B), the information comprising a number of repetitions of a signal to be transmitted by wireless device 110A or to wireless device 110A by target network node 115B as part of performing at least one radio operation. The number of repetitions may be based on a coverage enhancement level of wireless device 110A with respect to at least one of a neighbor cell associated with target network node 115B and a serving cell associated with a serving network node 115A of wireless device 110A. Wireless device 110A performs the at least one radio operation according to the obtained information related to the signal transmission configuration for target network node 115B.

In certain embodiments, the at least one radio operation may comprise a random access procedure associated with a cell change of wireless device 110A from the serving cell associated with serving network node 115A to the neighbor cell associated with target network node 115B. The obtained information related to the signal transmission configuration for target network node 115B may comprise a number of repetitions of a random access preamble to be transmitted by wireless device 110A to target network node 115B as part of the random access procedure. In such a scenario, performing the at least one radio operation according to the obtained information related to the signal transmission configuration for target network node 115B may comprise transmitting the random access preamble according to the number of repetitions of the random access preamble comprised in the obtained information related to the signal transmission configuration for target network node 115B.

In certain embodiments, the at least one radio operation may comprise identifying a CGI of the neighbor cell associated with target network node 115B. The obtained information related to the signal transmission configuration for target network node 115B may comprise a number of repetitions of a broadcast transmission to wireless device 110A by target network node 115B. In such a scenario, performing the at least one radio operation according to the obtained information related to the signal transmission configuration for target network node 115B may comprise: receiving a number of broadcast transmissions from target network node 115B equal to the number of repetitions of the broadcast transmission comprised in the obtained information related to the signal transmission configuration for target network node 115B; and identifying the CGI of the neighbor cell based on the received broadcast transmissions.

In some cases, wireless device 110A may transmit the obtained information related to the signal transmission configuration for target network node 115B to target network node 115B. In other words, wireless device 110A may use the obtained information to further transmit or forward the information to target network node 115B. For example, if wireless device 110A has an UL connection with target network node 115B (such as an SCell, PSCell, etc.) then wireless device 110A may transmit the obtained information to target network node 115B.

Wireless device 110A may obtain the information related to the signal transmission configuration for target network node 115B in any suitable manner. For example, in certain embodiments wireless device 110A may receive, from serving network node 115A, the information related to the signal transmission configuration for target network node 115B. As another example, wireless device 110A may determine, based on one or more predefined rules, the information related to the signal transmission configuration for target network node 115B. The information related to the signal transmission configuration may comprise any suitable information. For example, in certain embodiments the information related to the signal transmission configuration may comprise one or more sets of information related to the signal transmission configurations for one or more signals being transmitted or expected to be transmitted by or to target network node 115B. In certain embodiments, the information may comprise one or more of: a parameter that is the number of repetitions of the signal to be transmitted by wireless device 110A or to wireless device 110A by target network node 115B as part of performing the at least one radio operation; and an indication associated with a pre-defined parameter defining the number of repetitions of the signal to be transmitted by wireless device 110A or to wireless device 110A by target network node 115B as part of performing the at least one radio operation. The number of repetitions may comprise a number of redundancy versions or the number of times the same signal is to be transmitted or repeated by target network node 115B.

In certain embodiments, wireless device 110A may adapt the at least one radio operation based on the obtained information related to the signal transmission configuration for target network node 115B. Wireless device 110A may adapt the at least one radio operation in any suitable manner based on any suitable criteria. As one example, wireless device 110A may adapt the at least one radio operation based on at least one set of information related to the signal transmission configuration (which, as described above, may be received from first network node 115A). As another example, wireless device 110A may use the obtained information to adapt one or more radio operations in wireless device 110A when it receives one or more signals from target network node 115B. Examples of radio operations include, but are not limited to: using a particular type of receiver for receiving signals; one or more measurement procedures for processing the received signals; and sharing resources (e.g., memory, processors etc.) between different procedures such as between measurements and data reception. Examples of adaptation of measurement procedure include, but are not limited to, adapting the number and/or size of samples used for averaging measurement during the measurement period and measurement sampling rate, among others. In certain embodiments, the adapted/configured transmissions are then transmitted by the UE. In yet another example, the adapted/configured transmissions are then transmitted by the second network node and the UE, e.g., to enable bidirectional measurements.

To illustrate the adaptation of radio operations, consider the following examples. In one example embodiment, if the number of repetitions of the same signal is above or equal to a certain threshold (e.g., K≥40) and the coverage enhancement level of wireless device 110A with respect to target network node 115B is above a certain threshold (e.g., SINR>−10 dB), then wireless device 110A may use a less robust receiver for receiving signals from target network node 115B. A less robust receiver does not mitigate interference or does not fully mitigate interference when receiving signals or finish data decoding before receiving all the repeated signals.

In another example, if the number of repetitions of the same signal is below a certain threshold (e.g., K<30) and coverage enhancement level of wireless device 110A with respect to second network node 115B is below a certain threshold (e.g., SINR>−12 dB), then wireless device 110A may use a more robust receiver for receiving signals from target network node 115B. A more robust receiver does mitigate interference or does more effectively mitigate interference when receiving signals. The more robust receiver, however, involves more complexity and consumes more power or battery compared to the less robust receiver.

Figure 3:
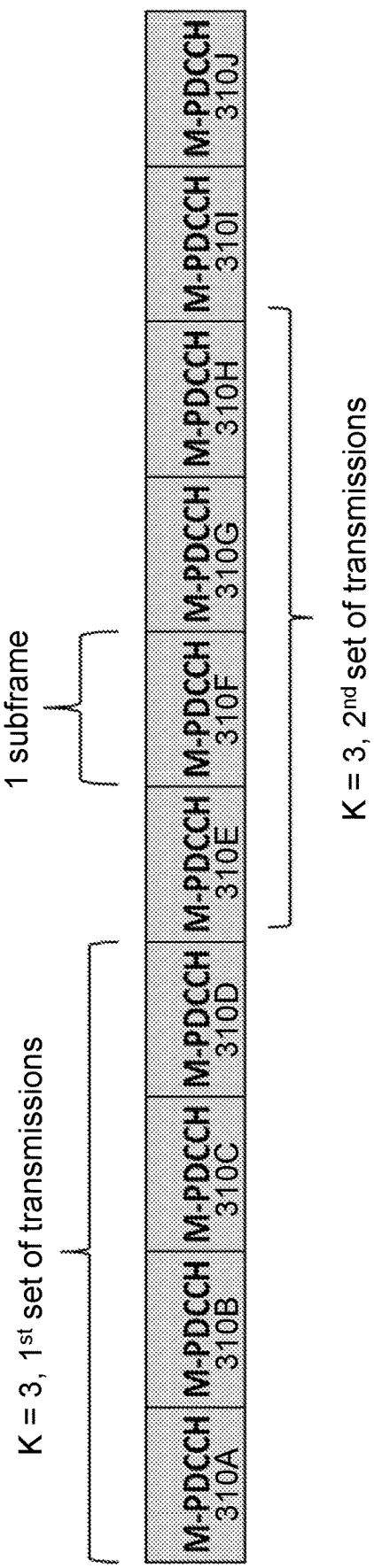
FIG. 3 illustrates an example of Type A repetition on consecutive subframes, in accordance with certain embodiments.

FIG. 3 illustrates an example of Type A repetition on consecutive subframes, in accordance with certain embodiments. More particularly, FIG. 3 illustrates a plurality of consecutive subframes 310A-310J. Type A repetition comprises repetition on consecutive subframes. In the example of FIG. 3. Type A repetition uses a value of K=3 for both a first set of transmissions and a second set of transmissions. Thus, the first set of transmissions includes an initial transmission in subframe 310A, followed by K=3 repetitions in subframes 310B-310D. A second set of transmissions includes an initial transmission in subframe 310E, followed by K=3 repetitions in subframes 310F, 310G, and 310H. Although FIG. 3 illustrates an example in which transmissions occur on M-PDCCH, the present disclosure is not limited to such an example.

Figure 4:
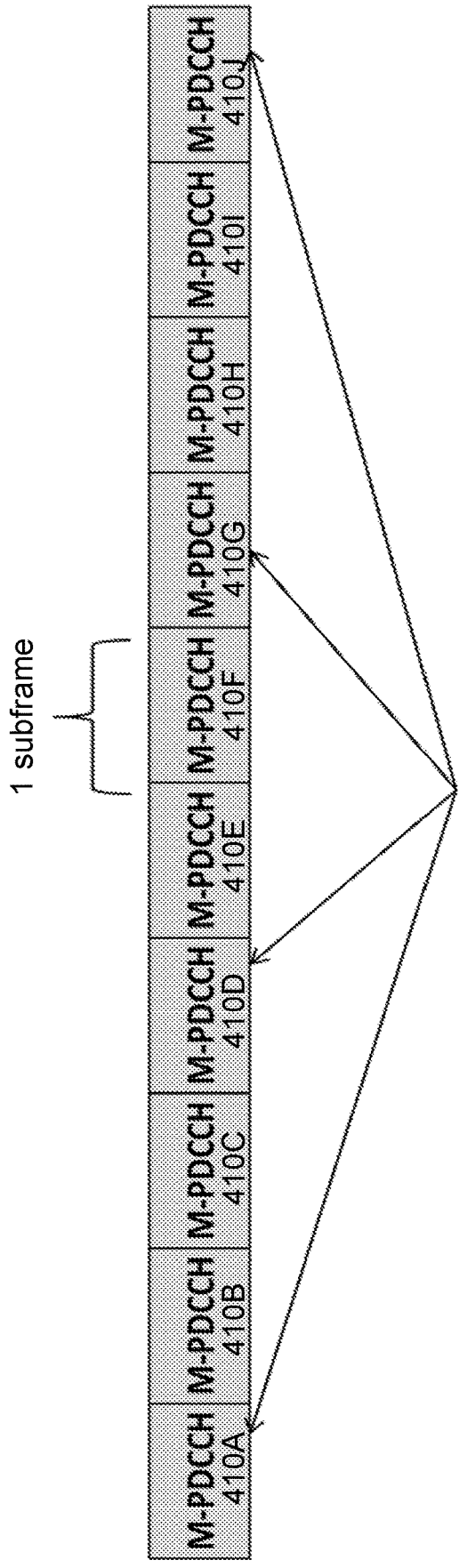
FIG. 4 illustrates an example of Type B repetition across multiple subframes, in accordance with certain embodiments.

FIG. 4 illustrates an example of Type B repetition across multiple subframes, in accordance with certain embodiments. More particularly, FIG. 4 illustrates a plurality of consecutive subframes 410A-410J. Type B repetition comprises repetition across multiple subframes. In the example of FIG. 4, Type B repetition uses a value of K=3, with one original transmission in subframe 410A, and 3 repetitions of the same signal transmitted in every Ith subframe (where I=3). Thus, subframes 410D, 410G, and 410J include repetitions of the same signal transmitted in subframe 410A. Although FIGURE $ illustrates an example in which transmissions occur on M-PDCCH, the present disclosure is not limited to such an example.

Figure 5:
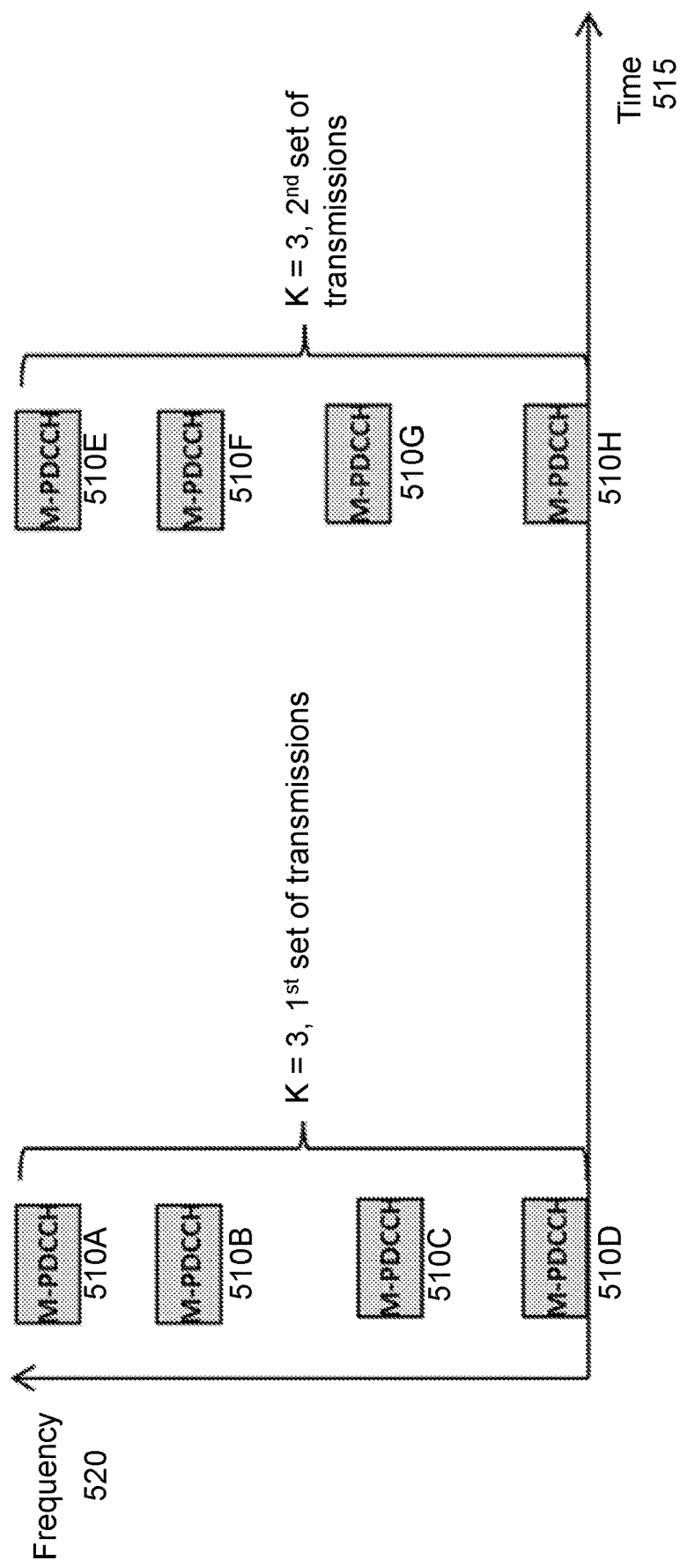
FIG. 5 illustrates an example of Type C repetition in frequency domain, in accordance with certain embodiments.

FIG. 5 illustrates an example of Type C repetition in frequency domain, in accordance with certain embodiments. More particularly, FIG. 5 illustrates a plurality of subframes 510A-510H, with time 515 illustrated on the X-axis and frequency 520 illustrated on the Y-axis. Type C repetition comprises repetition in frequency domain (shown on the Y-axis). In the example of FIG. 5, Type C repetition uses a value of K=3 for the first and second sets of transmissions. The first set of transmissions, which occur at the same time but with different frequency, includes initial transmission in subframe 510A and three repetitions of the same signal at subframes 510B, 510C, and 510D. The second set of transmissions, which occur at the same time but with different frequency, include initial transmission 510E and three repetitions of the same signal at subframes 510F, 510G, and 510H. Although FIG. 5 illustrates an example in which transmissions occur on M-PDCCH, the present disclosure is not limited to such an example.

Figure 6:
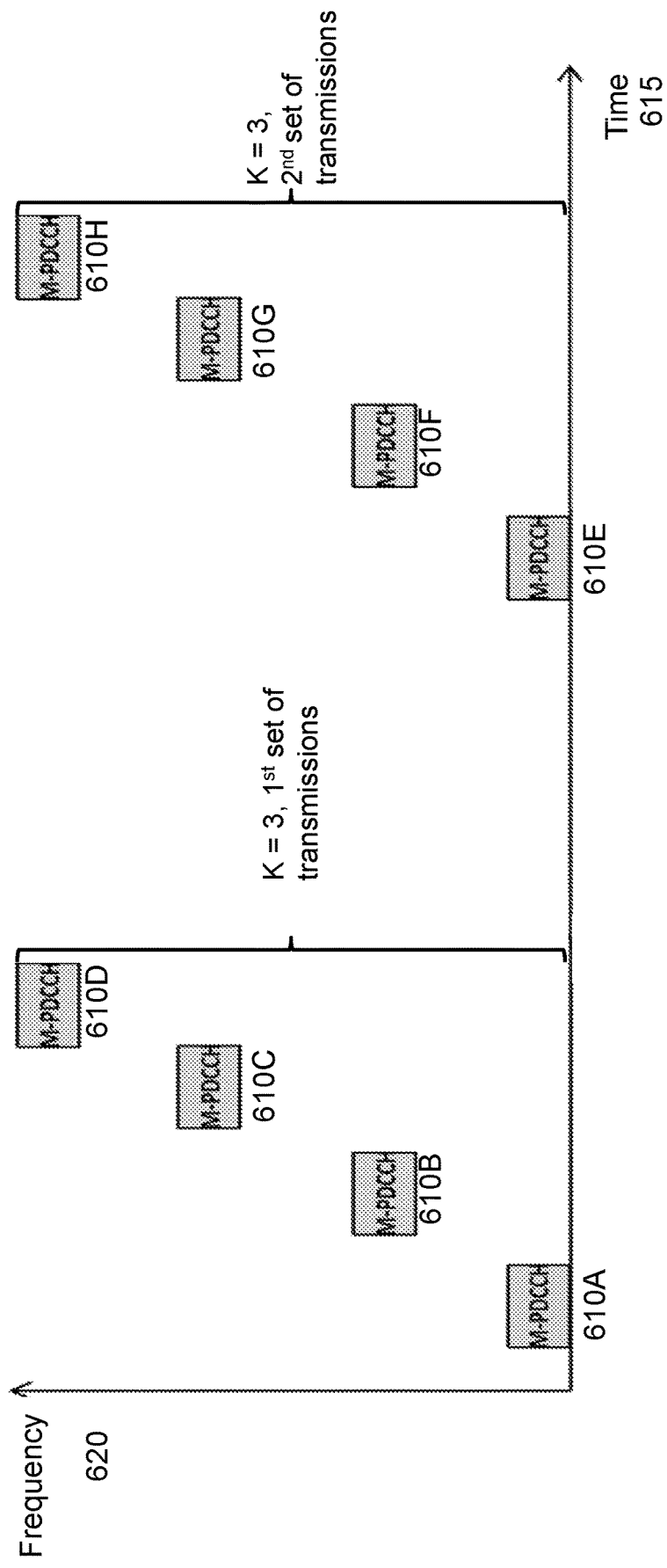
FIG. 6 illustrates an example of Type D repetition in time and frequency domain, in accordance with certain embodiments.

FIG. 6 illustrates an example of Type D repetition in time and frequency domain, in accordance with certain embodiments. More particularly, FIG. 6 illustrates a plurality of subframes 610A-610H, with time 615 illustrated on the X-axis and frequency 620 illustrated on the Y-axis. Type D repetition comprises repetition in time and frequency domain. In the example of FIG. 4, Type D repetition uses a value of K=3 for the first and second sets of transmissions. The first set of transmissions, which occur at different times and at different frequencies, includes an initial transmission in subframe 610A and three repetitions of the same signal in subframes 610B, 610C, and 610D. The second set of transmissions, which occur at different times and at different frequencies, includes an initial transmission in subframe 610E and three repetitions of the same signal in subframes 610F, 610G, and 610H. Although FIG. 6 illustrates an example in which transmissions occur on M-PDCCH, the present disclosure is not limited to such an example.

Figure 7:
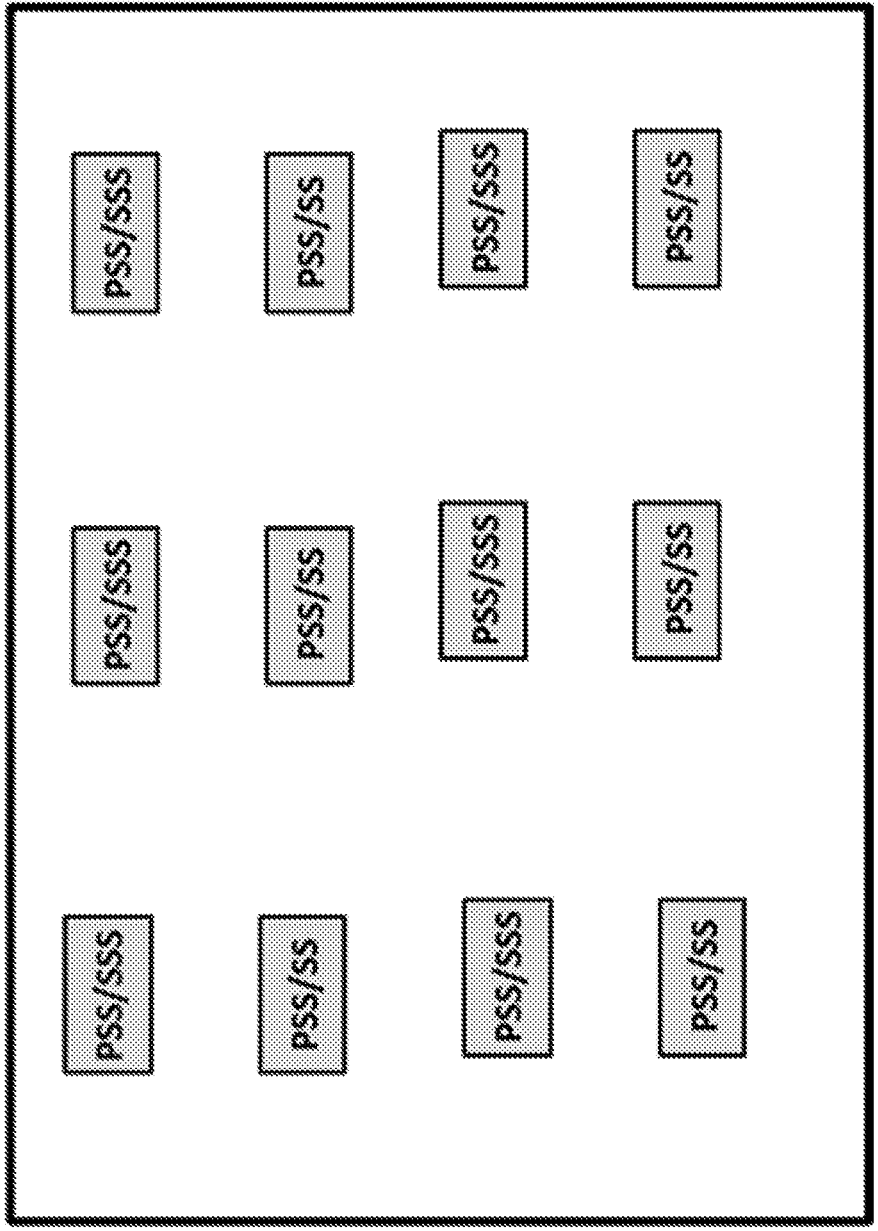
FIG. 7 illustrates an example of Type E repetition, in accordance with certain embodiments.

FIG. 7 illustrates an example of Type E repetition, in accordance with certain embodiments. More particularly, FIG. 7 illustrates a single subframe 710 that includes a plurality of resource elements for PSS/SSS. Type E repetition involves repetition with increased resource element density of any particular signal.

Figure 8:
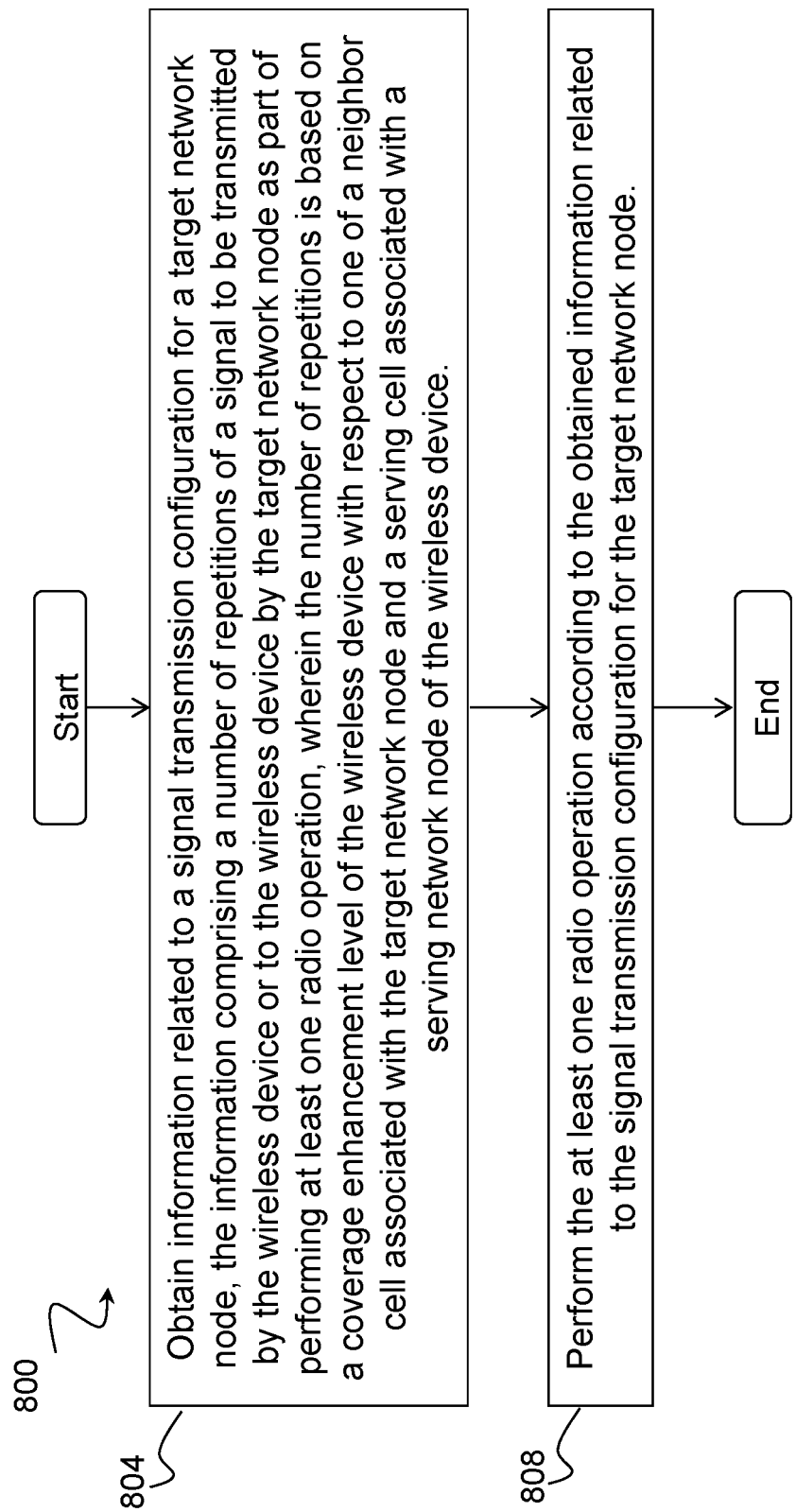
FIG. 8 is a flow diagram of a method in a wireless device, in accordance with certain embodiments.

FIG. 8 is a flow diagram of a method 800 in a wireless device, in accordance with certain embodiments. The method begins at step 804, where the wireless device obtains information related to a signal transmission configuration for a target network node, the information comprising a number of repetitions of a signal to be transmitted by the wireless device or to the wireless device by the target network node as part of performing at least one radio operation, wherein the number of repetitions is based on a coverage enhancement level of the wireless device with respect to at least one of a neighbor cell associated with the target network node and a serving cell associated with a serving network node of the wireless device. The information related to the signal transmission configuration for the target network node may comprise one of: a parameter that is the number of repetitions of the signal to be transmitted by the wireless device or to the wireless device by the target network node as part of performing the at least one radio operation; and an indication associated with a pre-defined parameter defining the number of repetitions of the signal to be transmitted by the wireless device or to the wireless device by the target network node as part of performing the at least one radio operation.

In certain embodiments, obtaining information related to the signal transmission configuration for the target network node may comprise receiving, from the serving network node, information related to the signal transmission configuration for the target network node. In certain embodiments, obtaining information related to the signal transmission configuration for the target network node may comprise determining, by the wireless device based on one or more pre-defined rules, the information related to the signal transmission configuration for the target network node.

At step 808, the wireless device performs the at least one radio operation according to the obtained information related to the signal transmission configuration for the target network node. In certain embodiments, the method may comprise transmitting the obtained information related to the signal transmission configuration for the target network node to the target network node. The method may comprise adapting the at least one radio operation based on the obtained information related to the signal transmission configuration for the target network node.

In certain embodiments, the at least one radio operation may comprise a random access procedure associated with a cell change of the wireless device from the serving cell associated with the serving network node to the neighbor cell associated with the target network node. The obtained information related to the signal transmission configuration for the target network node may comprise a number of repetitions of a random access preamble to be transmitted by the wireless device to the target network node as part of the random access procedure. Performing the at least one radio operation according to the obtained information related to the signal transmission configuration for the target network node may comprise transmitting the random access preamble according to the number of repetitions of the random access preamble comprised in the obtained information related to the signal transmission configuration for the target network node.

In certain embodiments, the at least one radio operation may comprise identifying a CGI of the neighbor cell associated with the target network node. The obtained information related to the signal transmission configuration for the target network node may comprise a number of repetitions of a broadcast transmission to the wireless device by the target network node. Performing the at least one radio operation according to the obtained information related to the signal transmission configuration for the target network node may comprise receiving a number of broadcast transmissions from the target network node equal to the number of repetitions of the broadcast transmission comprised in the obtained information related to the signal transmission configuration for the target network node; and identifying the CGI of the neighbor cell based on the received broadcast transmissions.

Figure 9:
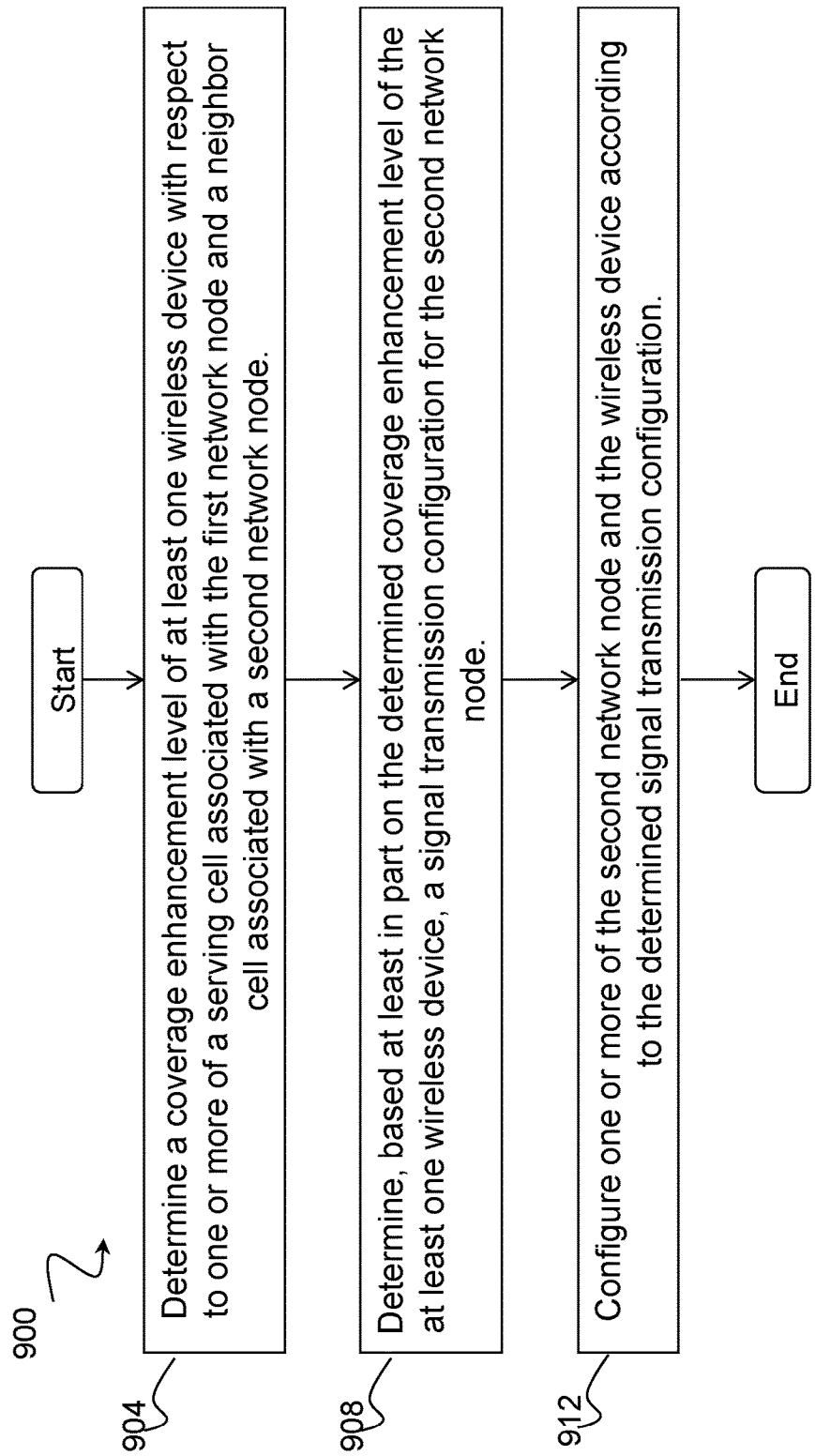
FIG. 9 is a flow diagram of a method in a first network node, in accordance with certain embodiments.

FIG. 9 is a flow diagram of a method 900 in a first network node, in accordance with certain embodiments. The method begins at step 904, where the first network node determines a coverage enhancement level of at least one wireless device with respect to at least one of a serving cell associated with the first network node and a neighbor cell associated with a second network node. The coverage enhancement level of the at least one wireless device with respect to at least one of the serving cell associated with the first network node and the neighbor cell associated with the second network node may be determined based on one or more of: one or more radio measurement results; a mobility profile of the wireless device; location information for the wireless device; and capability information for the wireless device.

At step 908, the first network node determines, based at least in part on the determined coverage enhancement level of the at least one wireless device, a signal transmission configuration for the second network node. The determined signal transmission configuration for the second network node may comprise information related to a number of repetitions of a signal to be transmitted by one of the wireless device and the second network node as part of performing at least one radio operation, the number of repetitions based on the determined coverage enhancement level of the wireless device. The method may comprise determining one or more types of operations the wireless device may perform with respect to the second network node. In such a scenario, the signal transmission configuration for the second network node may be determined also based on the determined one or more types of operations the wireless device may perform with respect to the second network node.

At step 912, the first network node configures one or more of the second network node and the wireless device according to the determined signal transmission configuration. In certain embodiments, the method may comprise sending the determined signal transmission configuration to one or more of the second network node and the wireless device.

In certain embodiments, the at least one radio operation may comprise a random access procedure associated with a cell change of the wireless device from the serving cell associated with the first network node to the neighbor cell associated with the second network node. The signal transmission configuration may comprise information related to a number of repetitions of a random access preamble to be transmitted by the wireless device to the second network node as part of the random access procedure. In such a scenario, configuring one or more of the second network node and the wireless device according to the determined signal transmission configuration may comprise configuring the wireless device to transmit the random access preamble according to the number of repetitions of the random access preamble comprised in the signal transmission configuration for the second network node.

In certain embodiments, the at least one radio operation may comprise identifying a CGI of the neighbor cell associated with the second network node. The signal transmission configuration may comprise a number of repetitions of a broadcast transmission to the wireless device by the second network node. In such a scenario, configuring one or more of the second network node and the wireless device according to the determined signal transmission configuration may comprise configuring the wireless device to: receive a number of broadcast transmissions from the second network node equal to the number of repetitions of the broadcast transmission comprised in the signal transmission configuration for the second network node; and identify the CGI of the neighbor cell based on the received broadcast transmissions.

Figure 10:
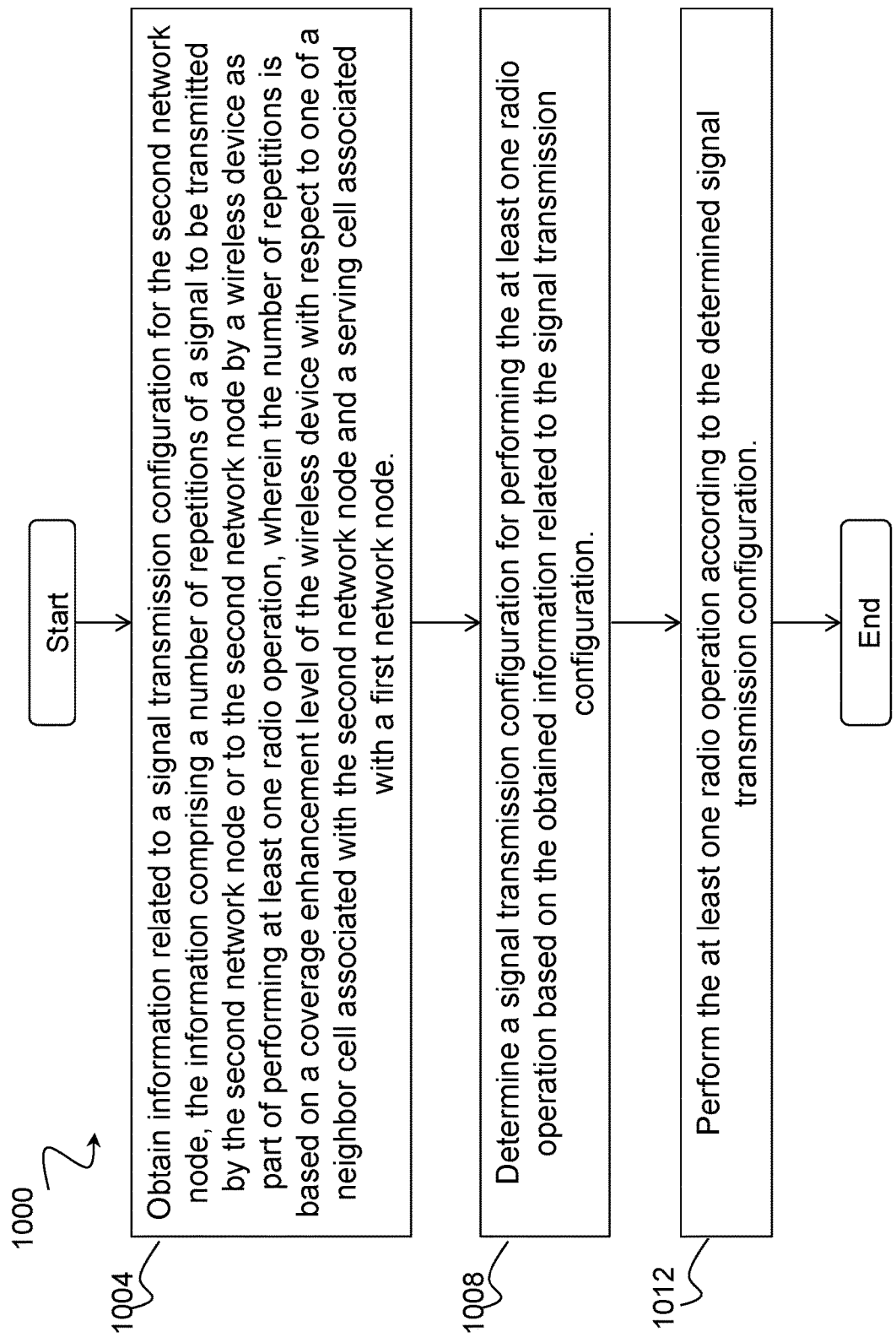
FIG. 10 is a flow diagram of a method in a second network node, in accordance with certain embodiments.

FIG. 10 is a flow diagram of a method 1000 in a second network node, in accordance with certain embodiments. The method begins at step 1004, where the second network node obtains information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node.

In certain embodiments, the information related to the signal transmission configuration for the second network node may comprise at least one of: a parameter that is the number of repetitions of the signal to be transmitted by the second network node or to the second network node by the wireless device as part of performing the at least one radio operation; and an indication associated with a pre-defined parameter defining the number of repetitions of the signal to be transmitted by the second network node or to the second network node by the wireless device as part of performing the at least one radio operation. Obtaining information related to the signal transmission configuration for the second network node may comprise receiving, from one or more of the first network node and the wireless device, information related to the signal transmission configuration for the second network node.

At step 1008, the second network node determines a signal transmission configuration for performing the at least one radio operation based on the obtained information related to the signal transmission configuration.

At step 1012, the second network node performs the at least one radio operation according to the determined signal transmission configuration. In certain embodiments, the method may comprise adapting the determined signal transmission configuration for performing the at least one radio operation.

In certain embodiments, the at least one radio operation may comprise a random access procedure associated with a cell change of the wireless device from the serving cell associated with the first network node to the neighbor cell associated with the second network node. The obtained information related to the signal transmission configuration for the second network node may comprise a number of repetitions of a random access preamble to be received by the second network node from the wireless device as part of the random access procedure. In such a scenario, performing the at least one radio operation according to the determined signal transmission configuration may comprise receiving the random access preamble according to the number of repetitions of the random access preamble comprised in the obtained information related to the signal transmission configuration for the second network node.

In certain embodiments, the at least one radio operation may comprise identifying a CGI of the neighbor cell associated with the second network node. The obtained information related to the signal transmission configuration for the second network node may comprise a number of repetitions of a broadcast transmission to the wireless device by the second network node. In such a scenario, performing the at least one radio operation according to the obtained information related to the signal transmission configuration for the second network node may comprise transmitting a number of broadcast transmissions equal to the number of repetitions of the broadcast transmission comprised in the received information related to the signal transmission configuration for the second network node.

Figure 11:
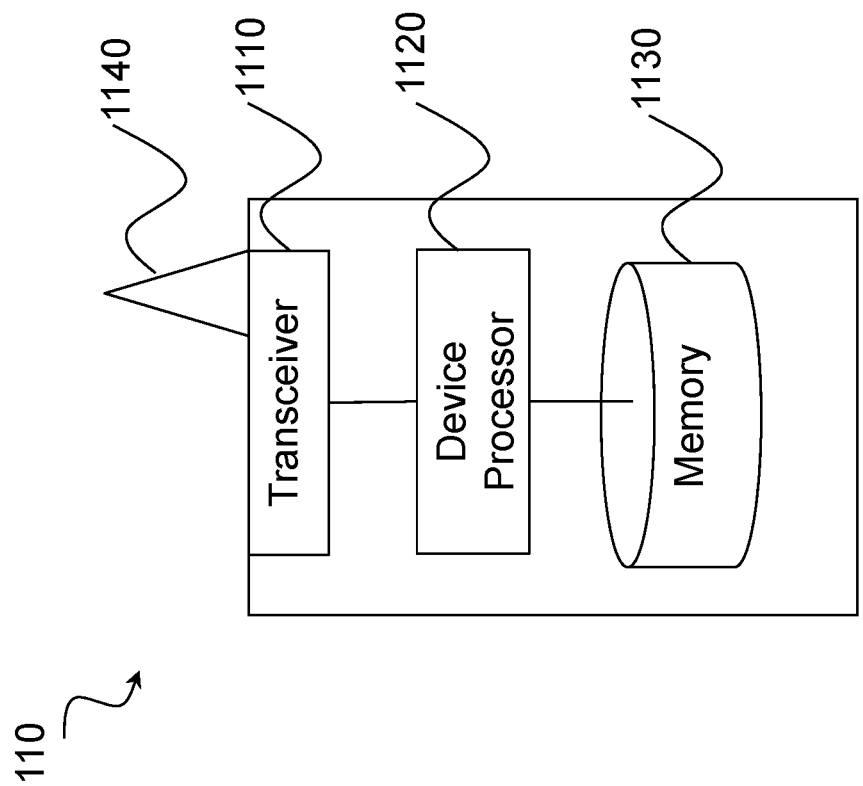
FIG. 11 is a block schematic of an exemplary wireless device, in accordance with certain embodiments.

FIG. 11 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, a low-cost and/or low-complexity UE, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1110, processor 1120, and memory 1130. In some embodiments, transceiver 1110 facilitates transmitting wireless signals to and receiving wireless signals from network node 115 (e.g., via antenna 1140), processor 1120 executes instructions to provide some or all of the functionality described above as being provided by wireless device 110, and memory 1130 stores the instructions executed by processor 1120.

Processor 1120 may include any suitable combination of hardware and software implemented in one or more modules to execute instructions and manipulate data to perform some or all of the described functions of wireless device 110, such as the functions of wireless device 110 described above in relation to FIGS. 1-10. In some embodiments, processor 1120 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 11 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1120. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 12:
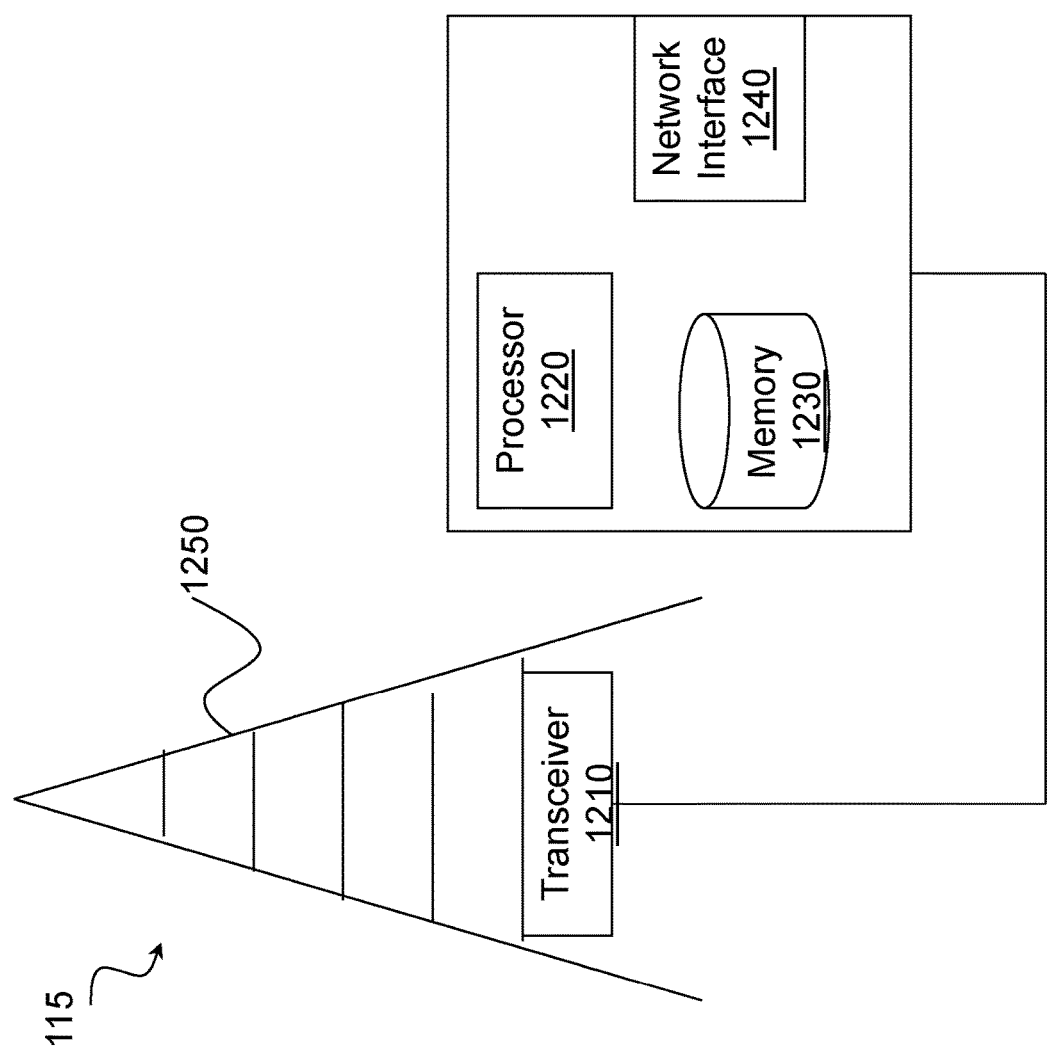
FIG. 12 is a block schematic of an exemplary network node, in accordance with certain embodiments.

FIG. 12 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogeneous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1210, processor 1220, memory 1230, and network interface 1240. In some embodiments, transceiver 1210 facilitates transmitting wireless signals to and receiving wireless signals from wireless device 110 (e.g., via antenna 1250), processor 1220 executes instructions to provide some or all of the functionality described above as being provided by a network node 115, memory 1230 stores the instructions executed by processor 1220, and network interface 1240 communicates signals to backend network components, such as a gateway, switch, router, Internet, Public Switched Telephone Network (PSTN), core network nodes or radio network controllers 130, etc.

Processor 1220 may include any suitable combination of hardware and software implemented in one or more modules to execute instructions and manipulate data to perform some or all of the described functions of network nodes 115, such as first network node 115A and second network node 115B described above in relation to FIGS. 1-10 above. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for network node 115, send output from network node 115, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of network node 115 may include additional components beyond those shown in FIG. 12 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 13:
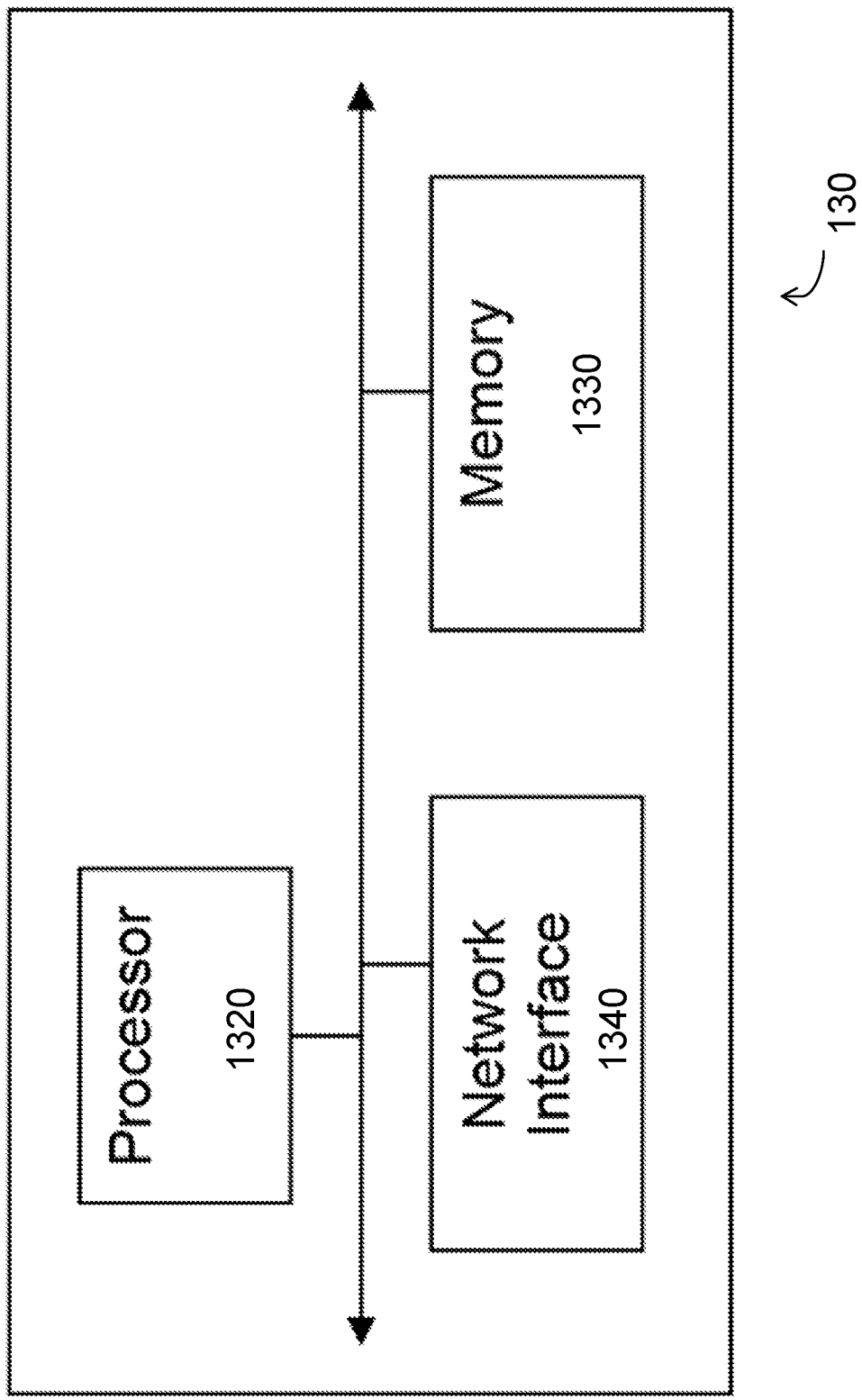
FIG. 13 is a block schematic of an exemplary radio network controller or core network node, in accordance with certain embodiments.

FIG. 13 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1320, memory 1330, and network interface 1340. In some embodiments, processor 1320 executes instructions to provide some or all of the functionality described above as being provided by the network node, memory 1330 stores the instructions executed by processor 1320, and network interface 1340 communicates signals to any suitable node, such as a gateway, switch, router, Internet, Public Switched Telephone Network (PSTN), network nodes 115, radio network controllers or core network nodes 130, etc.

Processor 1320 may include any suitable combination of hardware and software implemented in one or more modules to execute instructions and manipulate data to perform some or all of the described functions of the radio network controller or core network node 130. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

Figure 14:
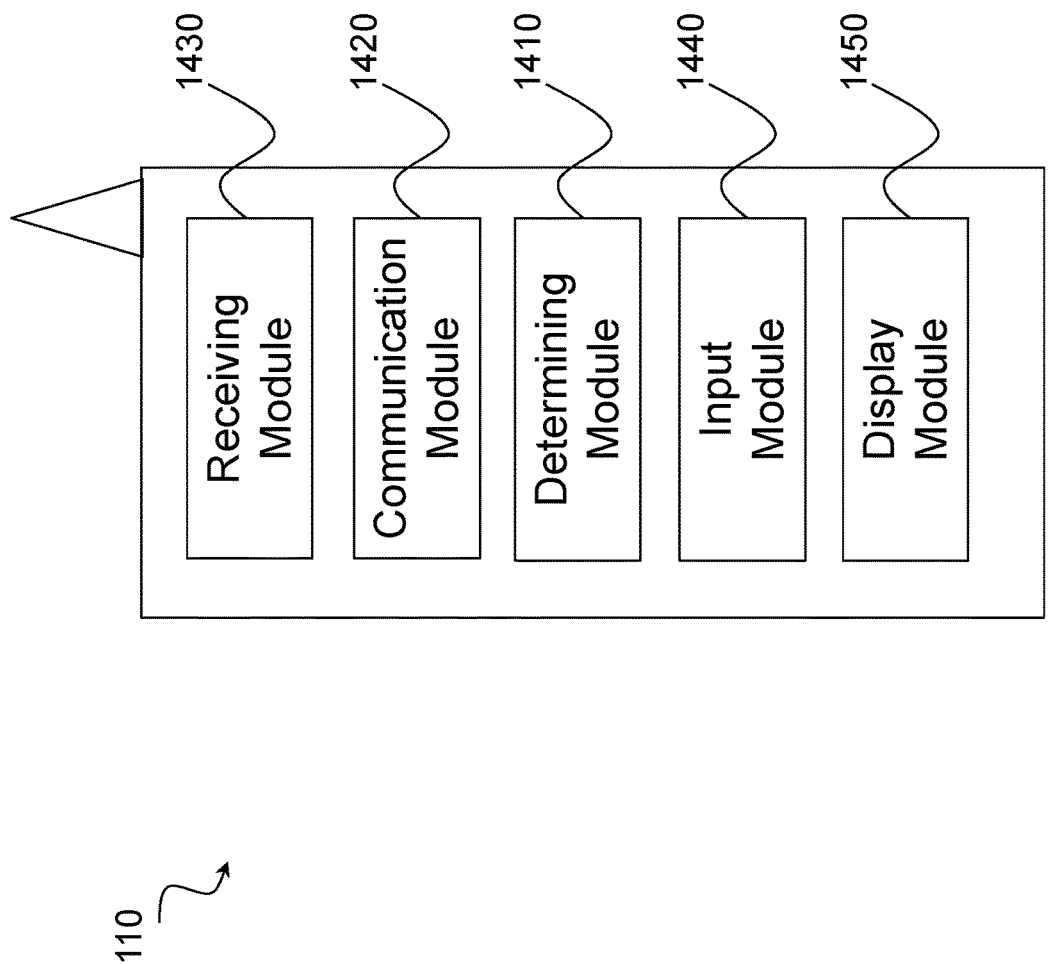
FIG. 14 is a block schematic of an exemplary wireless device, in accordance with certain embodiments.

FIG. 14 is a block schematic of an exemplary wireless device, in accordance with certain embodiments. Wireless device 110 may include one or more modules. For example, wireless device 110 may include a determining module 1410, a communication module 1420, a receiving module 1430, an input module 1440, a display module 1450, and any other suitable modules. In some embodiments, one or more of determining module 1410, communication module 1420, receiving module 1430, or any other suitable module may be implemented using one or more processors, such as processor 1120 described above in relation to FIG. 11. In certain embodiments, the functions of two or more of the various modules may be combined into a single module. Wireless device 110 may perform the methods for neighbor cell adaptive configuration to enable enhanced coverage operation of user equipment described above with respect to FIGS. 1-10.

Determining module 1410 may perform the processing functions of wireless device 110. For example, determining module 1410 may obtain information related to a signal transmission configuration for a target network node (e.g., determine, based on one or more pre-defined rules, the information related to the signal transmission configuration for the target network node). As another example, determining module 1410 may perform the at least one radio operation according to the obtained information related to the signal transmission configuration for the target network node. As still another example, determining module 1410 may identify the CGI of the neighbor cell based on the received broadcast transmissions. As yet another example, determining module 1410 may adapt the at least one radio operation based on the obtained information related to the signal transmission configuration for the target network node. Determining module 1410 may include or be included in one or more processors, such as processor 1120 described above in relation to FIG. 11. Determining module 1410 may include analog and/or digital circuitry configured to perform any of the functions of determining module 1410 and/or processor 1120 described above. The functions of determining module 1410 described above may, in certain embodiments, be performed in one or more distinct modules.

Communication module 1420 may perform the transmission functions of wireless device 110. For example, communication module 1420 may transmit a random access preamble according to the number of repetitions of the random access preamble comprised in the obtained information related to the signal transmission configuration for the target network node. As another example, communication module 1420 may transmit the obtained information related to the signal transmission configuration for the target network node to the target network node. Communication module 1420 may transmit messages to one or more of network nodes 115 of network 100. Communication module 1420 may include a transmitter and/or a transceiver, such as transceiver 1110 described above in relation to FIG. 11. Communication module 1420 may include circuitry configured to wirelessly transmit messages and/or signals. In particular embodiments, communication module 1420 may receive messages and/or signals for transmission from determining module 1410. In certain embodiments, the functions of communication module 1420 described above may be performed in one or more distinct modules.

Receiving module 1430 may perform the receiving functions of wireless device 110. As one example, receiving module 1430 may obtain information related to a signal transmission configuration for a target network node (e.g., receive, from the serving network node, information related to the signal transmission configuration for the target network node). As another example, receiving module 1430 may receive a number of broadcast transmissions from the target network node equal to the number of repetitions of the broadcast transmission comprised in the obtained information related to the signal transmission configuration for the target network node. Receiving module 1430 may include a receiver and/or a transceiver, such as transceiver 1110 described above in relation to FIG. 11. Receiving module 1430 may include circuitry configured to wirelessly receive messages and/or signals. In particular embodiments, receiving module 1430 may communicate received messages and/or signals to determining module 1410. The functions of receiving module 1430 described above may, in certain embodiments, be performed in one or more distinct modules.

Input module 1440 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1410.

Display module 1450 may present signals on a display of wireless device 110. Display module 1450 may include the display and/or any appropriate circuitry and hardware configured to present signals on the display. Display module 1450 may receive signals to present on the display from determining module 1410.

Determining module 1410, communication module 1420, receiving module 1430, input module 1440, and display module 1450 may include any suitable configuration of hardware and/or software. Wireless device 110 may include additional modules beyond those shown in FIG. 14 that may be responsible for providing any suitable functionality, including any of the functionality described above and/or any additional functionality (including any functionality necessary to support the various solutions described herein).

Figure 15:
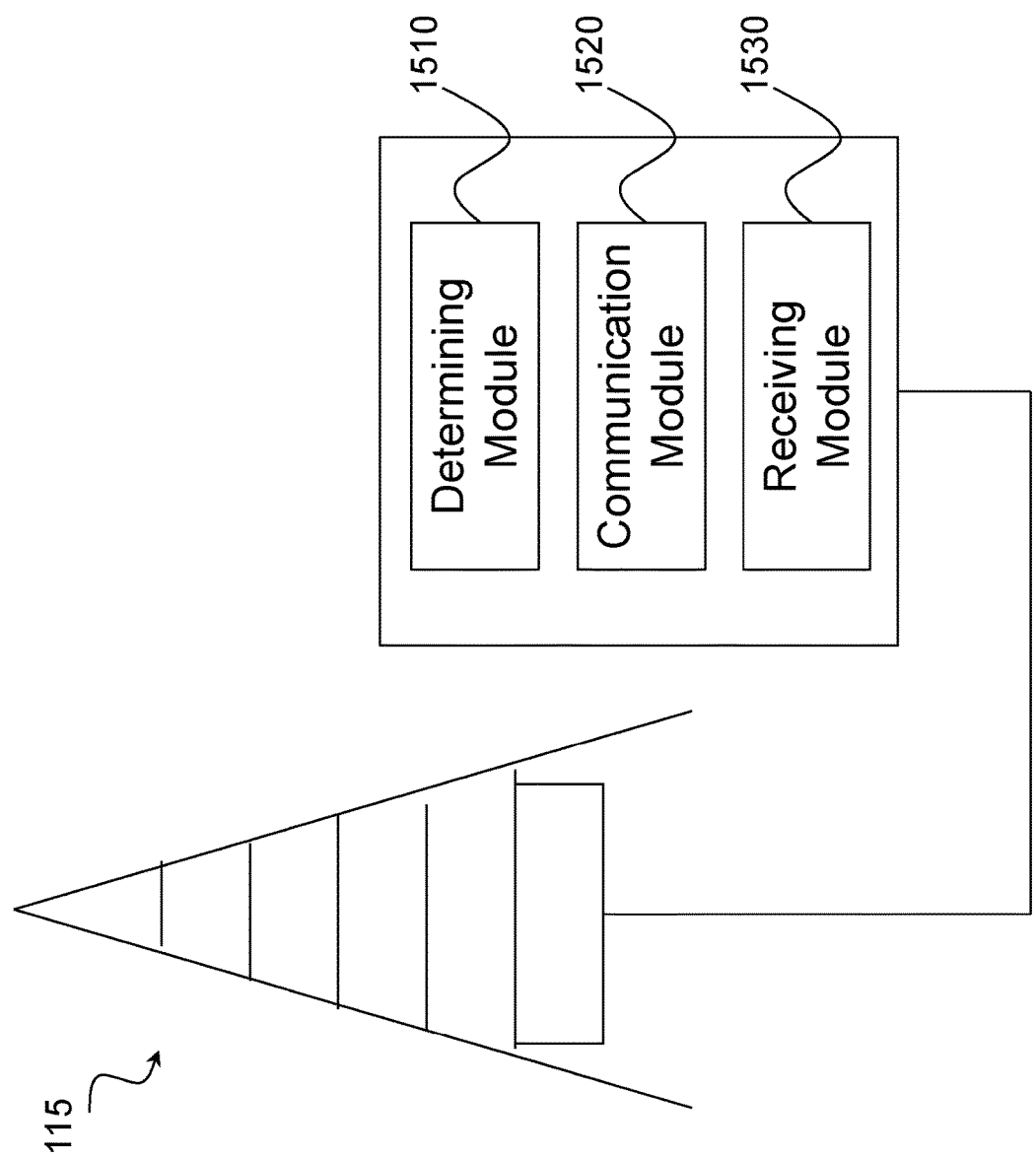
FIG. 15 is a block schematic of an exemplary network node, in accordance with certain embodiments.

FIG. 15 is a block schematic of an exemplary network node 115, in accordance with certain embodiments. Network node 115 may include one or more modules. For example, network node 115 may include determining module 1510, communication module 1520, receiving module 1530, and any other suitable modules. In some embodiments, one or more of determining module 1510, communication module 1520, receiving module 1530, or any other suitable module may be implemented using one or more processors, such as processor 1220 described above in relation to FIG. 12. In certain embodiments, the functions of two or more of the various modules may be combined into a single module. Network node 115 may perform the methods for neighbor cell adaptive configuration to enable enhanced coverage operation of user equipment described above with respect to FIGS. 1-10.

Determining module 1510 may perform the processing functions of network node 115. In certain embodiments, network node 115 may perform the functions of the first network node (or serving network node) described above with respect to FIG. 1-10. In such a scenario, determining module 1510 may determine a coverage enhancement level of at least one wireless device with respect to at least one of a serving cell associated with the first network node and a neighbor cell associated with a second network node. As another example, determining module 1510 may determine, based at least in part on the determined coverage enhancement level of the at least one wireless device, a signal transmission configuration for the second network node. As still another example, determining module 1510 may configure one or more of the second network node and the wireless device according to the determined signal transmission configuration. As yet another example, determining module 1510 may determine one or more types of operations the wireless device may perform with respect to the second network node, wherein the signal transmission configuration for the second network node is determined also based on the determined one or more types of operations the wireless device may perform with respect to the second network node.

In certain embodiments, network node 115 may perform the functions of the second network node (or target network node) described above in relation to FIGS. 1-10. In such a scenario, determining module 1510 may obtain information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node. As another example, determining module 1510 may determine a signal transmission configuration for performing the at least one radio operation based on the obtained information related to the signal transmission configuration. As still another example, determining module 1510 may perform the at least one radio operation according to the determined signal transmission configuration. As yet another example, determining module 1510 may adapt the determined signal transmission configuration for performing the at least one radio operation Determining module 1510 may include or be included in one or more processors, such as processor 1220 described above in relation to FIG. 12. Determining module 1510 may include analog and/or digital circuitry configured to perform any of the functions of determining module 1510 and/or processor 1220 described above. The functions of determining module 1510 may, in certain embodiments, be performed in one or more distinct modules.

Communication module 1520 may perform the transmission functions of network node 115. In certain embodiments, network node 115 may perform the functions of the first network node (or serving network node) described above with respect to FIGS. 1-10. In such a scenario, communication module 1520 may send the determined signal transmission configuration to one or more of the second network node and the wireless device.

In certain embodiments, network node 115 may perform the functions of the second network node (or target network node) described above with respect to FIGS. 1-10. In such a scenario, communication module 1520 may transmit a number of broadcast transmissions equal to the number of repetitions of the broadcast transmission comprised in the received information related to the signal transmission configuration for the second network node.

Communication module 1520 may transmit messages to one or more of wireless devices 110. Communication module 1520 may include a transmitter and/or a transceiver, such as transceiver 1210 described above in relation to FIG. 12. Communication module 1520 may include circuitry configured to wirelessly transmit messages and/or signals. In particular embodiments, communication module 1520 may receive messages and/or signals for transmission from determining module 1510 or any other module.

Receiving module 1530 may perform the receiving functions of network node 115. In certain embodiments, network node 115 may perform the functions of the second network node (or target network node) described above in relation to FIGS. 1-10. In such a scenario, receiving module 1530 may obtain information related to a signal transmission configuration for the second network node, the information comprising a number of repetitions of a signal to be transmitted by the second network node or to the second network node by a wireless device as part of performing at least one radio operation, wherein the number of repetitions is based on a coverage enhancement level of the wireless device with respect to at least one of a neighbor cell associated with the second network node and a serving cell associated with a first network node. As another example, receiving module 1530 may receive, from one or more of the first network node and the wireless device, information related to the signal transmission configuration for the second network node. As still another example, receiving module 1530 may receive the random access preamble according to the number of repetitions of the random access preamble comprised in the obtained information related to the signal transmission configuration for the second network node.

Receiving module 1530 may receive any suitable information from a wireless device. Receiving module 1530 may include a receiver and/or a transceiver, such as transceiver 1210 described above in relation to FIG. 12. Receiving module 1530 may include circuitry configured to wirelessly receive messages and/or signals. In particular embodiments, receiving module 1530 may communicate received messages and/or signals to determining module 1510 or any other suitable module.

Determining module 1510, communication module 1520, and receiving module 1530 may include any suitable configuration of hardware and/or software. Network node 115 may include additional modules beyond those shown in FIG. 15 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
AGNSS Assisted GNSS
AP Access Point
BLER Block Error Rate
BS Base Station
BSC Base Station Controller
BTS Base Transceiver Station
CDM Code Division Multiplexing CE Coverage Enhancement
CGI Cell Global ID
CID Cell ID (positioning method)
CPE Customer Premises Equipment
CRS Cell-Specific Reference Signal
CSI Channel State Information
CSI-RS Channel State Information Reference Signal
CQI Channel Quality Indicators
D2D Device-to-device
DAS Distributed Antenna System
DMRS Demodulation Reference Signals
DL Downlink
DRX Discontinuous Reception
E-CID Enhanced CID
eDRX enhanced DRX or extended DRX
eNB evolved Node B
EPDCCH Enhanced Physical Downlink Control Channel
E-SMLC Evolved SMLC
ESS Extended Synchronization Signals
FDD Frequency Division Duplex
GNSS Global Navigation Satellite Signals
HD-FDD Half-Duplex Frequency Division Duplex
IE Information Element
LAN Local Area Network
LEE Laptop Embedded Equipment
LME Laptop Mounted Equipment
LTE Long Term Evolution
M2M Machine-to-Machine
MAN Metropolitan Area Network
MBSFN Multicast-Broadcast Single-Frequency Network
MBSFN RS MBSFN Reference Signals
MCE Multi-cell/multicast Coordination Entity
MDT Minimization of Drive Tests
MSR Multi-standard Radio
MTC Machine-Type Communication
NAS Non-Access Stratum
O&M Operation and Maintenance
OTDOA Observed Time Difference of Arrival
PBCH Physical Broadcast Channel
PCell Primary Cell
PCFICH Physical Control Format Indicator Channel
PCI Physical Cell Identity
PDCCH Physical Downlink Control Channel
PDSCH Physical Downlink Shared Channel
PHICH Physical Hybrid ARQ Indicator Channel
PMCH Physical Multicast Channel
PMI Precoding Matrix Indicator
PRS Positioning Reference Signals
PSCell Primary Secondary Cell
PSS Primary Synchronization Signal
PSTN Public Switched Telephone Network
PUSCH Physical Uplink Shared Channel
PUCCH Physical Uplink Control Channel
RAT Radio Access Technology
RB Resource Block
RF Radio Frequency
RI Rank Indicator
RLF Radio Link Failure
RLM Radio Link Monitoring
RNC Radio Network Controller
RRC Radio Resource Control
RRH Remote Radio Head
RRU Remote Radio Unit
RSRP Reference Symbol Received Power
RSRQ Reference Symbol Received Quality
RSSI Received Signal Strength Indicator
RSTD Reference Signal Time Difference
RTT Round Trip Time
RX-TX Receive-Transmit
SCell Secondary Cell
SI System Information
SNR Signal to Noise Ratio
SINR Signal to Interference plus Noise Ratio
SON Self-Organizing Network
SRS Sounding Reference Signals
SSS Secondary Synchronization Signal
TDD Time Division Duplex
TOA Time of Arrival
TTI Transmission Time Interval
UE User Equipment
UL Uplink
UMTS Universal Mobile Telecommunications System
WAN Wide Area Network

The invention claimed is:

1. A method in a wireless device, comprising:
obtaining information related to a signal transmission configuration for a target network node, the information comprising an indication associated with a pre-defined parameter defining the number of repetitions of the signal to be transmitted to the wireless device by the target network node, wherein the number of repetitions is based on a coverage enhancement level of the wireless device with respect to at least one of a neighbor cell associated with the target network node and a serving cell associated with a serving network node of the wireless device; and
performing the at least one radio operation according to the obtained information related to the signal transmission configuration for the target network node, wherein the at least one radio operation comprises identifying a cell global identity (CGI) of the neighbor cell associated with the target network node and
the obtained information related to the signal transmission configuration for the target network node comprises the number of repetitions of a broadcast transmission to the wireless device by the target network node.

2. The method of claim 1, wherein performing the at least one radio operation according to the obtained information related to the signal transmission configuration for the target network node comprises:
receiving a number of broadcast transmissions from the target network node equal to the number of repetitions of the broadcast transmission comprised in the obtained information related to the signal transmission configuration for the target network node; and
identifying the CGI of the neighbor cell based on the received broadcast transmissions.

3. A method in a serving network node, comprising:
determining a coverage enhancement level of at least one wireless device with respect to at least one of a serving cell associated with the serving network node and a neighbor cell associated with a target network node;
determining, based at least in part on the determined coverage enhancement level of the at least one wireless device, a signal transmission configuration for the target network node; and
configuring one or more of the target network node and the wireless device according to the determined signal transmission configuration,
the determined signal transmission configuration for the target network node comprises an indication associated with a pre-defined parameter defining the number of repetitions of the signal to be transmitted to the wireless device by the target network node, the number of repetitions based on the determined coverage enhancement level of the wireless device, wherein the at least one radio operation comprises identifying a cell global identity (CGI) of the neighbor cell associated with the target network node.

4. The method of claim 3, comprising:
sending the determined signal transmission configuration to one or more of the target network node and the wireless device.

5. The method of claim 3, wherein:
the signal transmission configuration comprises a number of repetitions of a broadcast transmission to the wireless device by the target network node; and
configuring one or more of the target network node and the wireless device according to the determined signal transmission configuration comprises configuring the wireless device to:
receive a number of broadcast transmissions from the target network node equal to the number of repetitions of the broadcast transmission comprised in the signal transmission configuration for the target network node; and
identify the CGI of the neighbor cell based on the received broadcast transmissions.

6. A method in a target network node, comprising:
obtaining information related to a signal transmission configuration for the target network node, the information comprising an indication associated with a pre-defined parameter defining the number of repetitions of the signal to be transmitted to the wireless device by the target network node, wherein the number of repetitions is based on a coverage enhancement level of the wireless device with respect to at least one of a neighbor cell associated with the target network node and a serving cell associated with a serving network node;
determining a signal transmission configuration for performing the at least one radio operation based on the obtained information related to the signal transmission configuration; and
performing the at least one radio operation according to the determined signal transmission configuration,
the obtained information related to the signal transmission configuration for the target network node comprises a number of repetitions of a broadcast transmission to the wireless device by the target network node and
performing the at least one radio operation according to the obtained information related to the signal transmission configuration for the target network node comprises: transmitting a number of broadcast transmissions equal to the number of repetitions of the broadcast transmission comprised in the received information related to the signal transmission configuration for the target network node, wherein the at least one radio operation comprises identifying a cell global identity (CGI) of the neighbor cell associated with the target network node.

7. A wireless device, comprising:
one or more processors, the one or more processors configured to:
obtain information related to a signal transmission configuration for a target network node, the information comprising an indication associated with a pre-defined parameter defining the number of repetitions of the signal to be transmitted to the wireless device by the target network node, wherein the number of repetitions is based on a coverage enhancement level of the wireless device with respect to at least one of a neighbor cell associated with the target network node and a serving cell associated with a serving network node of the wireless device; and
perform the at least one radio operation according to the obtained information related to the signal transmission configuration for the target network node,
wherein the at least one radio operation comprises identifying a cell global identity (CGI) of the neighbor cell associated with the target network node and
the obtained information related to the signal transmission configuration for the target network node comprises the number of repetitions of a broadcast transmission to the wireless device by the target network node.

8. The wireless device of claim 7, wherein the one or more processors configured to perform the at least one radio operation according to the obtained information related to the signal transmission configuration for the target network node comprise one or more processors configured to:
receive a number of broadcast transmissions from the target network node equal to the number of repetitions of the broadcast transmission comprised in the obtained information related to the signal transmission configuration for the target network node; and
identify the CGI of the neighbor cell based on the received broadcast transmissions.

9. A serving network node, comprising:
one or more processors, the one or more processors configured to:
determine a coverage enhancement level of at least one wireless device with respect to at least one of a serving cell associated with the serving network node and a neighbor cell associated with a target network node;
determine, based at least in part on the determined coverage enhancement level of the at least one wireless device, a signal transmission configuration for the target network node; and
configure one or more of the target network node and the wireless device according to the determined signal transmission configuration,
the determined signal transmission configuration for the target network node comprises an indication associated with a pre-defined parameter defining the number of repetitions of the signal to be transmitted to the wireless device by the target network node, the number of repetitions based on the determined coverage enhancement level of the wireless device, wherein the at least one radio operation comprises identifying a cell global identity (CGI) of the neighbor cell associated with the target network node.

10. The serving network node of claim 9, wherein the one or more processors are configured to:
send the determined signal transmission configuration to one or more of the target network node and the wireless device.

11. The serving network node of claim 9, wherein:
the signal transmission configuration comprises a number of repetitions of a broadcast transmission to the wireless device by the target network node; and
the one or more processors configured to configure one or more of the target network node and the wireless device according to the determined signal transmission configuration comprise one or more processors configured to configure the wireless device to:
receive a number of broadcast transmissions from the target network node equal to the number of repetitions of the broadcast transmission comprised in the signal transmission configuration for the target network node; and identify the CGI of the neighbor cell based on the received broadcast transmissions.

12. A target network node, comprising:
one or more processors, the one or more processors configured to:
   obtain information related to a signal transmission configuration for the target network node, the information comprising an indication associated with a pre-defined parameter defining the number of repetitions of the signal to be transmitted to the wireless device by the target network node, wherein the number of repetitions is based on a coverage enhancement level of the wireless device with respect to at least one of a neighbor cell associated with the target network node and a serving cell associated with a serving network node;
   determine a signal transmission configuration for performing the at least one radio operation based on the obtained information related to the signal transmission configuration; and
   perform the at least one radio operation according to the determined signal transmission configuration, wherein the at least one radio operation comprises identifying a cell global identity (CGI) of the neighbor cell associated with the target network node the obtained information related to the signal transmission configuration for the target network node comprises a number of repetitions of a broadcast transmission to the wireless device by the target network node, wherein the one or more processors configured to perform the at least one radio operation according to the obtained information related to the signal transmission configuration for the target network node comprise one or more processors configured to:

transmit a number of broadcast transmissions equal to the number of repetitions of the broadcast transmission comprised in the received information related to the signal transmission configuration for the target network node.

* * * * *

UNITED STATES PATENT AND TRADEMARK OFFICE
CERTIFICATE OF CORRECTION

PATENT NO. : 10,708,831 B2
APPLICATION NO. : 15/772672
DATED : July 7, 2020
INVENTOR(S) : Iana Siomina et al.

It is certified that error appears in the above-identified patent and that said Letters Patent is hereby corrected as shown below:

On the Title Page

"(72) Inventors: Iana Siomina, Täby (SE); Muhammad Kazmi, Sundbyberg (SE); Santhan Thangarasa, Vällingby (SE); Kazuyoshi Uesaka, Kanagawa (JP)"

Should read:
-- (72) Inventors: Iana Siomina, Täby (SE); Muhammad Kazmi, Sundbyberg (SE); Santhan Thangarasa, Vällingby (SE); Kazuyoshi Uesaka, Kawasaki, Kanagawa (JP) --.

Signed and Sealed this
Seventeenth Day of November, 2020

Andrei Iancu
*Director of the United States Patent and Trademark Office*